United States Patent
Jennings et al.

(10) Patent No.: US 12,447,193 B2
(45) Date of Patent: Oct. 21, 2025

(54) COMPOSITIONS AND METHODS FOR PREVENTION AND TREATMENT OF INFECTIONS

(71) Applicant: The University of Memphis Research Foundation, Memphis, TN (US)

(72) Inventors: J. Amber Jennings, Memphis, TN (US); Leslie Pace, Marion, AR (US); Madison N. Brown, Arlington, TN (US)

(73) Assignee: The University of Memphis Research Foundation, Memphis, TN (US)

( * ) Notice: Subject to any disclaimer, the term of this patent is extended or adjusted under 35 U.S.C. 154(b) by 0 days.

(21) Appl. No.: 17/102,081

(22) Filed: Nov. 23, 2020

(65) Prior Publication Data

US 2021/0154264 A1     May 27, 2021

Related U.S. Application Data

(60) Provisional application No. 62/940,359, filed on Nov. 26, 2019.

(51) Int. Cl.
| | |
|---|---|
| *A61K 47/26* | (2006.01) |
| *A61K 9/00* | (2006.01) |
| *A61K 9/06* | (2006.01) |
| *A61K 9/16* | (2006.01) |
| *A61K 31/7036* | (2006.01) |
| *A61K 38/14* | (2006.01) |
| *A61K 47/34* | (2017.01) |
| *A61K 47/36* | (2006.01) |
| *A61P 31/04* | (2006.01) |

(52) U.S. Cl.
CPC ............ *A61K 38/14* (2013.01); *A61K 9/0019* (2013.01); *A61K 9/0024* (2013.01); *A61K 9/06* (2013.01); *A61K 9/1694* (2013.01); *A61K 31/7036* (2013.01); *A61K 47/26* (2013.01); *A61K 47/34* (2013.01); *A61K 47/36* (2013.01); *A61P 31/04* (2018.01)

(58) Field of Classification Search
None
See application file for complete search history.

(56) References Cited

U.S. PATENT DOCUMENTS

| | | | |
|---|---|---|---|
| 2010/0076480 A1* | 3/2010 | Lu | G01F 11/022 606/192 |
| 2015/0119357 A1* | 4/2015 | Medina | A61L 24/08 514/55 |
| 2017/0042817 A1* | 2/2017 | Teo | B01D 61/025 |
| 2017/0258967 A1* | 9/2017 | Haggard | A61K 9/19 |

OTHER PUBLICATIONS

Huang, Drug Delivery and Translational Research, 8, 2018 (Year: 2018).*
Allison, Nature, 473, 2011 (Year: 2011).*
Barraud, PLOS one, 8, 12, 2013 (Year: 2013).*
Pace, Marine Drugs, 17, 2019 (Year: 2019).*
Rhodes, WJO, 8, 2, 2017 (Year: 2017).*
Boles, Military Medicine, 183, 2018 (Year: 2018).*

* cited by examiner

*Primary Examiner* — Robert A Wax
*Assistant Examiner* — William Craigo
(74) *Attorney, Agent, or Firm* — Husch Blackwell LLP; Timothy L. Capria; Alexandra C. Lynn

(57) ABSTRACT

Compositions of chitosan and one or more polyalcohols, such as mannitol and polyethylene glycol, and methods of use thereof, are provided. The disclosed compositions can deliver high concentrations of localized antimicrobials and metabolites to make infections more susceptible to antimicrobials. The disclosed compositions may be used to deliver biologically active agents to an infection at a site of trauma or surrounding an indwelling medical device, to treat an infection caused by persister bacterial cells, and to treat and/or prevent the formation of biofilm bacteria on an indwelling medical device or surrounding tissue.

39 Claims, 19 Drawing Sheets

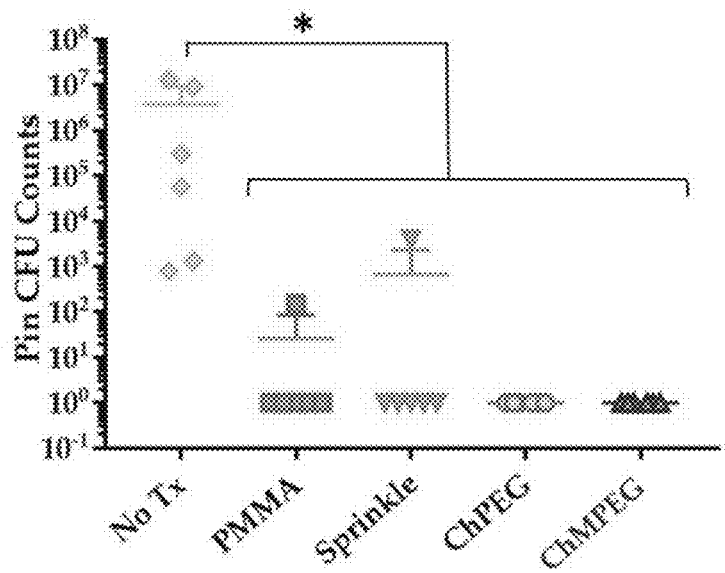
FIG. 17
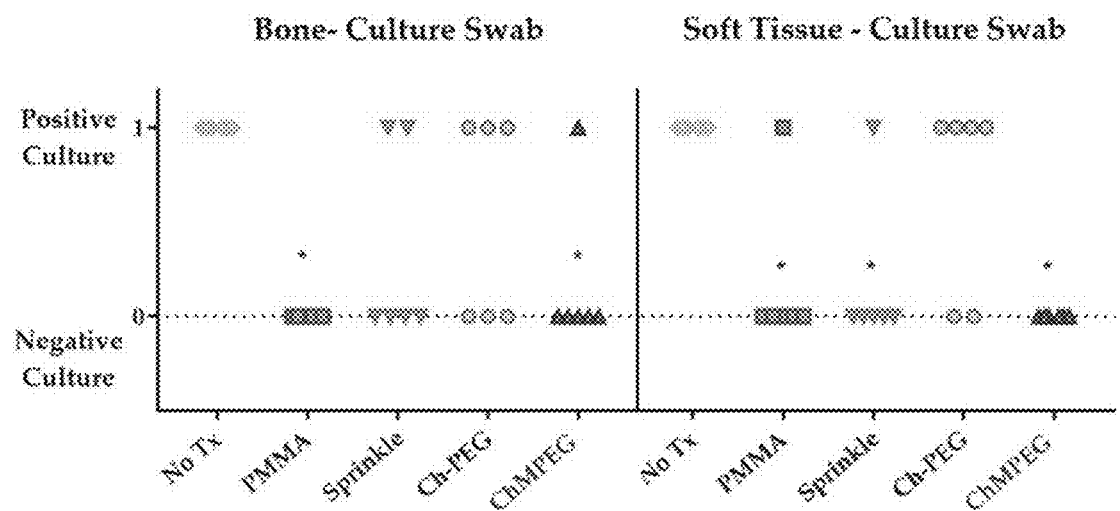
FIG. 18A
FIG. 18B

COMPOSITIONS AND METHODS FOR PREVENTION AND TREATMENT OF INFECTIONS

CROSS-REFERENCE TO RELATED APPLICATION

This application claims the benefit of U.S. Provisional Patent Application No. 62/940,359, filed Nov. 26, 2019, which is incorporated by reference herein in its entirety.

STATEMENT REGARDING FEDERALLY SPONSORED RESEARCH OR DEVELOPMENT

This invention was made with government support under grant number R01 AR066050-01 awarded by the U.S. National Institutes of Health. The government has certain rights in the invention.

In this context "government" refers to the government of the United States of America.

FIELD OF THE DISCLOSURE

The present disclosure relates generally to compositions and methods for the treatment and prevention of infections.

BACKGROUND OF THE DISCLOSURE

A surgical site infection is an infection that occurs after surgery in the part of the body where the surgery took place. Infections after surgery due to surgical procedures, trauma, or implanted devices are common and frequently lead to adverse consequences for patients. Over 80% of infections are caused by a microbial community known as a biofilm. Biofilms are organized bacterial communities found on indwelling devices, such as catheters or surgically implanted materials, or tissues surrounding a site of injury. These biofilms are often resistant to typical antibiotics and can require up to 1000 times the minimum inhibitory concentration of antibiotics to effectively eradicate the biofilms, which is well above the levels seen with systemically delivered antibiotics. The resistance of biofilm to antimicrobials can arise from a number of factors including reduced drug diffusion into the biofilm, decreased metabolic activity of microorganisms within the biofilm, and defense mechanisms such as the persister cell phenotype, which is a metabolically dormant cell genetically identical to a typical cell (Vega, N. M., et al., *Nature chemical biology*, 8(5):431 (2012); Costerton, J. W., P. S. Stewart, and E. P. Greenberg, *Science*, 284(5418):1318-1322 (1999)).

Injectable and biodegradable antimicrobial delivery systems may decrease the prevalence of surgical site infections, for example, in the realm of orthopedics and in the context of one-stage revision surgeries or the debridement, antibiotics and implant retention ("DAIR") technique for total joint arthroplasties, by releasing antibiotics at high concentrations to inhibit and eradicate biofilm formation (Moriarty, T. F., et al., *EFORT open reviews*, 1(4):89-99 (2016); Qasim, S. N., A. Swann, and R. Ashford, *SICOT J*, 3:2 (2017)). However, treatment with high concentrations of antibiotics often results in antibiotic toxicity and systemic side effects, which can lead to increased hospital stays and adverse outcomes.

Additionally, there are currently no devices on the market that contain an active ingredient used to specifically target persister cells in established biofilms. Clinically, the local drug delivery devices that can elute antibiotics directly into a surgical site include polymethyl-methacrylate beads (PMMA), calcium sulfate ($CaSO_4$) beads, collagen or chitosan sponges, and polylactic acid (PLA) hydrogels. However, there are disadvantages with each of these drug delivery devices. For instance, PMMA is not enzymatically degraded in the body and must be removed after a certain period of time. $CaSO_4$ does eventually degrade, but this degradation does not match its elution profile, leading to undesirable drainage, pH changes, and hypercalcemia as the $CaSO_4$ degrades. Collagen sponges are typically very expensive, can transmit disease infection, and also have a degradation/elution mismatch profile. Chitosan sponges exhibit the same downfalls as collagen sponges, experiencing long degradation periods within the body. PLA hydrogels degrade into acidic components decreasing cell viability, are also expensive, and have not been used in tandem with mannitol.

Accordingly, there is a need in the art for improved compositions and treatment methods that can target persister cells within biofilm without, or minimizing, the adjunct use of high concentrations of antibiotics.

SUMMARY

The problems expounded above, as well as others, are addressed by the following inventions, although it is to be understood that not every embodiment of the inventions described herein will address each of the problems described above. In some embodiments, it has been unexpectedly discovered that biodegradable compositions of chitosan and one or more polyalcohols, such as mannitol and polyethylene glycol are advantageous, for instance, as a prevention and treatment tool in infections.

In a first aspect, a method for producing a biodegradable composition including chitosan and one or more polyalcohols is provided, the method including dissolving chitosan and a polyalcohol (e.g., mannitol or PEG) in an acidic solvent to form a solution; and drying (e.g., lyophilisation) the solution to form the biodegradable composition comprising chitosan and the polyalcohol.

In a second aspect, a method for producing a biodegradable composition including chitosan, mannitol, and a polyalcohol such as polyethylene glycol (PEG) is provided, the method including dissolving PEG, chitosan, and mannitol in one or more acids in a solvent to form a solution; drying the solution to form the biodegradable composition comprising chitosan, mannitol, and PEG; forming a thin film; and grinding the thin film into a powder.

In a third aspect, a biodegradable composition including chitosan and one or more polyalcohols (e.g., mannitol or PEG) is provided.

In a fourth aspect, a method for treating or preventing an infection at a site of trauma in a subject in need of treatment thereof is provided, the method including administering a therapeutically effective amount of the biodegradable composition provided above to the subject.

In a fifth aspect, a method for treating or preventing an infection caused by persister bacterial cells in a subject in need of treatment thereof is provided, the method including administering a therapeutically effective amount of the biodegradable composition provided above to reduce the survival or proliferation of persister bacterial cells at a site of the infection.

In a sixth aspect, a method for treating or preventing the formation of biofilm bacteria on an indwelling medical device or surrounding tissue is provided, the method including administering a therapeutically effective amount of the biodegradable composition provided above to reduce the number of biofilm bacteria present on one or both of the indwelling medical device and surrounding tissue.

In a seventh aspect, an indwelling medical device is provided, the indwelling medical device including the biodegradable composition provided above.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

FIG. 13A illustrates the scores after the week one time point and FIG. 13B illustrates the scores after the week four time point.

FIG. 17 is a scatterplot showing CFU counts of *S. aureus* (UAMS-1) collected from the harvested Titanium pin of each rabbit (n=6). Statistical difference is indicated by a * between the no treatment group and the treatment groups.

FIG. 18A is a scatterplot indicating the positive (bacterial growth) and negative (no bacterial growth) results of the surrounding soft tissue (n=6) and FIG. 18B is a scatterplot indicating the positive and negative results of the bone (n=6). Each surrounding soft tissue swab was swabbed during the retrieval of the titanium pin after three weeks for each group. The abbreviation Tx stands for treatment. * indicates statistically significant difference between the no treatment group.

DETAILED DESCRIPTION

A. Definitions

Figure 1A:
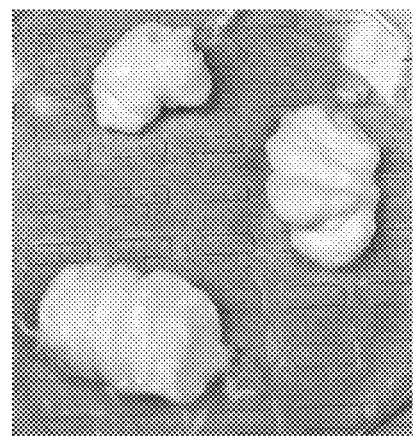
FIG. 1A shows the ChMPEG paste after ejection and FIG. 1B shows the ChMPEG paste after being submerged in phosphate buffered saline (PBS) for 3 days.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terminology used herein is for the purpose of describing particular embodiments only and is not intended to be limiting. As used herein, the singular forms "a," "an," and "the" are intended to include the plural forms as well, unless the context clearly indicates otherwise.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. For biological systems, the term "about" refers to an acceptable standard deviation of error, preferably not more than 2-fold of a given value.

Terms such as "administering" or "administration" include acts such as prescribing, dispensing, giving, or taking a substance such that what is prescribed, dispensed, given, or taken actually contacts the patient's body externally or internally (or both). In embodiments of this disclosure, terms such as "administering" or "administration" include self-administering, self-administration, and the like, of a substance. Indeed, it is specifically contemplated that instructions or a prescription by a medical professional to a subject or patient to take or otherwise self-administer a substance is an act of administration.

The terms "prevention," "prevent," "preventing," "suppression," "suppress," and "suppressing," as used herein, refer to a course of action (such as administering a pharmaceutical composition) initiated prior to the onset of a clinical manifestation of a disease state or condition so as to reduce its likelihood or severity. Such reduction in likelihood or severity need not be absolute to be useful. The term "in need of prevention," as used herein, refers to a judgment made by a caregiver that a patient requires or will benefit from prevention. This judgment is made based on a variety of factors that are in the realm of a caregiver's expertise, but that include the knowledge that the patient will be ill or may become ill, as the result of a condition that is preventable by a method or device of the disclosure.

The terms "treatment," "treat," and "treating," as used herein, refer to alleviating, ameliorating, reducing, or inhibiting one or more symptoms or physiological aspects of a disease, disorder, syndrome, or condition. "Treatment," as used herein, covers any treatment of a disease in a subject, and includes: (a) prevention of the disease or symptom from occurring in a subject which may be predisposed to the disease or symptom, but has not yet been diagnosed as having it; (b) the inhibition of the disease symptom, i.e., arresting its development; or (c) relief of the disease symptom, i.e., causing regression of the disease or symptom. Such treatment need not be absolute to be useful. The term "in need of treatment," as used herein, refers to a judgment made by a caregiver that a patient requires or will benefit from treatment. This judgment is made based on a variety of factors that are in the realm of a caregiver's expertise, but that include the knowledge that the patient is ill, or will be ill, as the result of a condition that is treatable by a method or device of the present disclosure.

The terms "inhibit," "suppress," "decrease," "interfere," and/or "reduce" (and like terms) generally refer to the act of reducing, either directly or indirectly, a function, activity, or behavior relative to the natural, expected, or average or relative to current conditions. It is understood that this is typically in relation to some standard or expected value, in other words it is relative, but that it is not always necessary for the standard or relative value to be referred to.

The terms "individual," "subject," or "patient," as used herein, refer to any animal, including mammals, such as mice, rats, other rodents, rabbits, dogs, cats, swine, cattle, sheep, horses, primates, humans, canines, and felines. The term may specify male or female or both, or exclude male or female.

The term "therapeutically effective amount" (or simply "effective amount"), as used herein, refers to an amount of an agent, either alone or as a part of a composition, that is capable of having any detectable, positive effect on any symptom, aspect, or characteristics of a disease state or condition. Such effect need not be absolute to be beneficial.

In the following discussion certain outside documents are referenced to enable the reader to make and use the subject matter described herein. Nothing contained herein is to be construed as an "admission" of prior art. Applicant expressly reserves the right to demonstrate, where appropriate, that such documents referenced herein do not constitute prior art under the applicable statutory provisions.

B. Compositions

The present disclosure provides biodegradable compositions that feature the use of a biopolymer having antimicrobial properties blended with a polyalcohol that has been shown to awaken dormant microorganisms and increase their susceptibility to antimicrobials. The compositions of the present disclosure are capable of delivering effective concentrations of antimicrobials and metabolites (i.e., polyalcohols) to make infections, for instance, biofilm-based infections, more susceptible to antimicrobials. A biofilm-based infection is an infection caused by a biofilm microorganism, that is, a population of microorganisms (bacteria, fungi, and/or protozoa, with associated bacteriophages and other viruses) that are concentrated at an interface (usually solid/liquid) and typically surrounded by an extracellular polymeric slime matrix. Examples of biofilm bacteria include gram-positive bacteria (e.g., *Bacillus* spp, *Listeria monocytogenes, Staphylococcus* spp, and *Lactobacillus plantarum*, and gram-negative bacteria (e.g., *Lactococcus lactis* and *Escherichia coli*, or *Pseudomonas aeruginosa*).

The compositions of the present disclosure include the use of chitosan. Without being bound by any particular theory, chitosan has been found to have a broad antimicrobial spectrum to which gram-negative, gram-positive bacteria and fungi are highly susceptible. Chitosan is a linear polysaccharide composed of randomly distributed β-(1→4)-linked D-glucosamine (deacetylated unit) and N-acetyl-D- glucosamine (acetylated unit). Chitosan is derived from chitin, a naturally occurring polymer. Chitin and chitosan are both biocompatible, biodegradable, and non-toxic biopolymers. Chitosan may be obtained from chitin by any method known in the art. Generally, chitosan is produced by deacetylation of chitin.

Chitosan is a weak base that is insoluble in water, but soluble in dilute aqueous acidic solutions. Due to chitosan's cationic charge, it has bioadhesive properties that allow it to bind to negatively charged surfaces, such as biological tissues present at a site of trauma or negatively charged (e.g., metallic) implanted devices. The degree of deacetylation of chitosan affects it resorption. Generally, as the degree of deacetylation increases, especially when under 50% degree of acetylation, the period of time for degradation and crystallinity also increases. In one embodiment, the degree of deacetylation of the chitosan utilized in the present disclosure is about 60 percent or greater. In another embodiment, the degree of deacetylation of the chitosan is about 70 percent or greater. In still another embodiment, the degree of deacetylation of the chitosan is about 80 percent or greater. For example, the chitosan may have a degree of deacetylation of about 82.46±1.679 percent. In an embodiment, the chitosan may have a degree of deacetylation of up to and including: 95%, 98%, or 100%. The chitosan contemplated by the present disclosure may have an average molecular weight of about 100,000 Da to about 350,000 Da. In another embodiment, the chitosan may have an average molecular weight of about 150,000 Da to about 350,000 Da. In still another embodiment, the chitosan may have an average molecular weight of about 200,000 Da to about 250,000 Da. For instance, the chitosan may have an average molecular weight of about 250,600 Da. In some embodiments, the chitosan is non-neutralized chitosan.

The compositions of the present disclosure may also include the use of a polyalcohol. The poly alcohol may be a sugar alcohol such as erythritol, hydrogenated starch hydrolysates (HSH), isomalt, lactitol, maltitol, mannitol, sorbitol, and xylitol. The sugar alcohol can be derived from a sugar by reduction. Without being bound by any particular theory, it is believed that the polyalcohol is a metabolic stimulant of persister bacterial cells within an infection or biofilm, making the infection or biofilm more susceptible to antimicrobials, such as chitosan. The term "persister bacterial cell" refers to a metabolically dormant subpopulation of microorganisms, typically bacteria, which are not sensitive to antimicrobial agents such as antibiotics. It is also believed that the mannitol enhances the antimicrobial properties of the chitosan by activating the antimicrobial potential of chitosan. Importantly, it is believed that this mannitol-chitosan interaction allows internalization of chitosan across bacterial cell membranes. An exemplary mannitol is shown by formula (1):

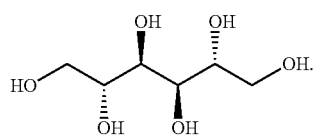

(1)

The polyalcohol advantageously enhances, for example, adhesion to surfaces and formation of a stable complex. This in turn helps to extend the duration of elution of antimicrobials to wounded tissue. In one embodiment, the polyalcohol is polyethylene glycol (PEG). PEG is a linear polymeric material that is polymerized by glycol monomers. PEG is a highly water-soluble material that exhibits low toxicity and immunogenicity. An exemplary PEG is shown by formula (2):

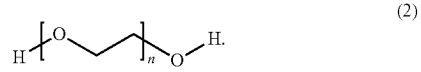

(2)

The PEG contemplated by the present disclosure may have a molecular weight ranging from about 6,000 g/mol to about 10,000 g/mol. In one embodiment, the PEG utilized in the present compositions has a molecular weight of about 6,000 g/mol to about 9,000 g/mol. In another embodiment, the PEG utilized has a molecular weight of about 6,000 g/mol to about 8,000 g/mol. For instance, in one embodiment, the PEG utilized has a molecular weight of about 8,000 g/mol. Any suitable polyalcohol (e.g., has a low toxicity and immunogenicity) may be used.

The chitosan and polyalcohol (e.g., Mannitol and/or PEG) components described above may be blended to form a composition. In one embodiment, the polyalcohol is dissolved in one or more acids in a solvent. The acid may be selected from acetic acid, citric acid, oxalic acid, propionic acid, ascorbic acid, hydrochloric acid, formic acid, salicylic acid, lactic acid, or combinations thereof. For example, the polyalcohol may be dissolved in acetic acid in a deionized water solution. Following dissolution of the polyalcohol, the chitosan and polyalcohol may also be dissolved in the solution to form the composition. In one embodiment, the solution described herein maintains a pH of about 5, which dispenses of the need for a step for neutralizing the chitosan. In some embodiments, the solutions are cast into containers (e.g., a dishes) and left to dry to form thin films. The films may then be ground separately into powder and can be stored for later use. In this aspect, by producing thin films and grinding the films into powder, the method dispenses of the need for any lyophilization steps.

In some embodiments, the compositions contain about 0.5 percent to about 3 percent weight/volume (w/v) of chitosan, preferably about 1 percent w/v of chitosan. In other embodiments, the compositions contain about 1 percent to about 3 percent w/v of mannitol, preferably about 2 percent w/v of mannitol. In still other embodiments, the compositions contain about 0.01 percent to about 10% of the one or more polyalcohols, about 0.1 percent to 5% w/v of the polyalcohols, about 0.2% to about 4% w/v of the polyalcohols, about 0.5 percent to about 2 percent w/v of the polyalcohols, or preferably about 1 percent w/v of the polyalcohols. In an embodiment, the amount of polyalcohols in the composition are less than about 5%.

In some embodiments, the disclosed compositions are biodegradable. As used herein, "biodegradable" refers to being susceptible to breakdown by biological activity. For example, the biodegradable compositions are susceptible to breakdown by enzymes present in vivo (for example, lysozyme, N-acetyl-o-glucosaminidase and lipases). Degradation of the disclosed compositions need not be complete. In one embodiment, the disclosed compositions are biodegradable over a time period of about one day to about four weeks. In another embodiment, the disclosed compositions are biodegradable over a time period of about five days to about three weeks. In still another embodiment, the disclosed compositions are biodegradable over a time period of about two weeks.

The compositions may be administered in any suitable form to provide delivery of the biologically active agents, for example, chitosan, antibiotics, and antifungals, to an infection or wound. In one embodiment, the compositions may be formulated for parenteral injection, such as in the form of solids, particles, pastes, or aqueous solutions. In this aspect, the disclosed compositions are administered locally, for example, by injection directly into a site to be treated. In another embodiment, the compositions may be formulated for local delivery to a wound, for instance, as a film or sponge. In still another embodiment, the compositions may be surgically implanted at a site where promotion of healing, treatment, and/or prevention of infection is required.

In one embodiment, the composition disclosed herein is administered as a paste. In this aspect, the paste may be formed by hydrating the composition powder with a salt solution, such as phosphate buffered saline solution (PBS). In one embodiment, the hydration ratio of PBS is about 1.5 mL/gram to about 3.5 mL/gram of composition powder. In another embodiment, the hydration ratio of PBS is about 2.0 mL/gram to about 3.0 mL/gram of composition powder. In still another embodiment, the hydration ratio of PBS is about 2.5 mL/gram of composition powder. In this aspect, the composition may also include pharmaceutically acceptable diluents, preservatives, solubilizers, emulsifiers, adjuvants, excipients, and/or carriers.

In another embodiment, the composition disclosed herein may be administered as a sponge. Generally, sponges are formed by providing a liquid solution of the composition that is capable of forming a porous three-dimensional structure. In one embodiment, the polyalcohol is dissolved in one or more acids in a solvent. The acid may be selected from acetic acid, citric acid, oxalic acid, propionic acid, ascorbic acid, hydrochloric acid, formic acid, salicylic acid, lactic acid, or combinations thereof. For example, the polyalcohol may be dissolved in acetic acid in a deionized water solution. Following dissolution of the polyalcohol, the chitosan and mannitol may also be dissolved in the solution to form the composition. In one embodiment, the solution described herein maintains a pH of about 5, which dispenses of the need for a step for neutralizing the chitosan. The solution is frozen (e.g., at a temperature of −20 degrees C. or below). The frozen solution is lyophilized to remove water while maintaining solid components intact to produce a sponge. The sponge may be used at this point, o treated with a stabilizer such as sodium hydroxide or a cross-linking polymer, such as glutaraldehyde. In some embodiments, the sponge delivers the biologically active agents to the site of infection or wound and/or the surrounding tissue. As used herein, the "surrounding tissue" refers to the tissue of the subject that is adjacent to an infection, a wound, or an indwelling medical device, but otherwise appears to be normal.

In still another embodiment, the composition disclosed herein may be administered as a coating (e.g., a film) that can be used to coat or wrap an indwelling medical device. As used herein, "indwelling medical device" refers to any device for use in the body of a subject, such as intravascular catheters (for example, intravenous and intra-arterial), right heart flow-directed catheters, Hickman catheters, arteriovenous fistulae, catheters used in hemodialysis and peritoneal dialysis (for example, catheters constructed of medical adhesive silicon such as SILASTIC, central venous catheters, peritoneal access catheters (TENCKOFF), and PTFE (TEFLON) catheters), vascular access ports, indwelling urinary catheters, urinary catheters, silicone catheters, ventricular catheters, synthetic vascular prostheses (for example, aortofemoral and femoropopliteal), prosthetic heart valves, prosthetic joints, orthopedic implants, penile implants, shunts (for example, Scribner, Torkildsen, central nervous system, portosystemic, ventricular, ventriculoperitoneal), intrauterine devices, tampons, dental implants, stents (for example, ureteral stents), artificial voice prostheses, tympanostomy tubes, gastric feeding tubes, endotracheal tubes, pacemakers, implantable defibrillators, tubing, cannulas, probes, blood monitoring devices, needles, and the like. In some embodiments, the composition is applied to the indwelling medical device prior to implantation. In this aspect, the composition can reduce the risk of infection associated with conventional implants by providing for the release of the biologically active agents from the indwelling medical device.

In yet another embodiment, the composition disclosed herein may be administered locally to the site of a wound. For instance, the composition may be formed into a size and shape sufficient to accommodate the wound being treated. In some embodiments, the compositions may be formed into plugs, meshes, strips, sutures, dressings, or any other form that is able to assist in the healing of a wound. The composition may self-adhere to the site of the wound or an adhesive may be applied to hold the composition in position during administration.

Any of the compositions described above can optionally be loaded with one or more biologically active agents at the site of care (for instance, at a doctors office, hospital, or urgent care center). As used herein, a "biologically active agent" is a compound that exerts a direct physiological effect on the subject or a microorganism, such as a biofilm bacteria, a virus, or a fungus. Examples of biologically active agents include, but are not limited to, antimicrobial agents such as antibiotics, antifungals, and antivirals; growth factors; anti-inflammatory agents; and analgesics. In some embodiments, the disclosed compositions include at least about 1 µg to about 500 mg of one or more biologically active agents per gram of composition. In another embodiment, the disclosed compositions include at least about 100 µg to about 300 mg of one or more biologically active agents per gram of composition. In still another embodiment, the disclosed compositions include at least about 500 µg to about 100 mg of one or more biologically active agents per gram of composition.

In some embodiments, the compositions disclosed herein are loaded with one or more antibiotics. Examples of antibiotics include, but are not limited to, aminoglycosides (for example, gentamicin, streptomycin, amikacin, kanamycin), β-lactams (for example, penicillins and cephalosporins), glycopeptides (for example, vancomycin and dalbavancin), bacitracins, macrolides (for example, erythromycins), lincosamides (for example, clindamycin), chloramphenicols, tetracyclines, amphotericins, cefazolins, clindamycins, mupirocins, sulfonamides and trimethoprim, rifampicins, metronidazoles, quinolones, novobiocins, polymyxins, gramicidins, or any salts or variants thereof. In a preferred embodiment, the compositions are loaded with vancomycin, amikacin, or combinations thereof.

In another embodiment, the compositions described herein are loaded with one or more antifungals. Examples of antifungals, include, but are not limited to, fungicidal and fungistatic agents such as benzoic acid, undecylenic alkanolamide, ciclopirox olamine, polyenes, imidazoles, allylamine, thiocarbamates, amphotericin B, butylparaben, clindamycin, econazole, fluconazole, flucytosine, griseofulvin, nystatin, voriconazole, and ketoconazole.

In still another embodiment, the compositions described herein are loaded with one or more antivirals that are capable of inhibiting replication of a virus. Examples of antivirals include, but are not limited to, 1,-D-ribofuranosyl-1,2,4-triazole-3 carboxamide, 9-2-hydroxy-ethoxy methylguanine, adamantanamine, 5-iodo-2'-deoxyuridine, trifluorothymidine, interferon, adenine arabinoside, protease inhibitors, thymidine kinase inhibitors, sugar or glycoprotein synthesis inhibitors, structural protein synthesis inhibitors, attachment and adsorption inhibitors, and nucleoside analogs such as acyclovir, penciclovir, valacyclovir, and ganciclovir.

In yet another embodiment, the disclosed compositions are loaded with one or more growth factors. Examples of growth factors include, but are not limited to, angiopoietin, acidic fibroblast growth factors (aFGF) (GenBank Accession No. NP_149127) and basic FGF (GenBank Accession No. AAA52448), bone morphogenic protein (BMP) (GenBank Accession No. BAD92827), vascular endothelial growth factor (YEGF) (GenBank Accession No. AAA35789 or NP_001020539), epidermal growth factor (EGF) (GenBank Accession No. NP_001954), transforming growth factor a (TGF-a) (GenBank Accession No. NP_003227) and transforming growth factor 3 (TFG-3) (GenBank Accession No. 1109243A), platelet-derived endothelial cell growth factor (PD-ECGFXGenBank Accession No. NP_001944), platelet-derived growth factor (PDGF)(GenBank Accession No. 1109245A), tumor necrosis factor α (TNF-α) (GenBank Accession No. CAA26669), hepatocyte growth factor (HGF) (GenBank Accession No. BAA14348), insulin like growth factor (IGF) (GenBank Accession No. P08833), erythropoietin (GenBank Accession No. P01588), colony stimulating factor (CSF), macrophage-CSF (M-CSFXGenBank Accession No. AAB59527), granulocyte/macrophage CSF (GM-CSF) (GenBank Accession No. NP_000749) and nitric oxide synthase (NOS) (GenBank Accession No. AAA36365).

In another embodiment, the disclosed compositions are loaded with one or more anti-inflammatory agents. Representative examples of non-steroidal anti-inflammatory agents include, without limitation, oxicams, such as piroxicam, isoxicam, tenoxicam, sudoxicam; salicylates, such as aspirin, disalcid, benorylate, trilisate, safapryn, solprin, diflunisal, and fendosal; acetic acid derivatives, such as diclofenac, fenclofenac, indomethacin, sulindac, tolmetin, isoxepac, furofenac, tiopinac, zidometacin, acemetacin, fentiazac, zomepirac, clindanac, oxepinac, felbinac, and ketorolac; fenamates, such as mefenamic, meclofenamic, flufenamic, niflumic, and tolfenamic acids; propionic acid derivatives, such as ibuprofen, naproxen, benoxaprofen, flurbiprofen, ketoprofen, fenoprofen, fenbufen, indoprofen, pirprofen, carprofen, oxaprozin, pranoprofen, miroprofen, tioxaprofen, suprofen, alminoprofen, and tiaprofenic; pyrazoles, such as phenylbutazone, oxyphenbutazone, feprazone, azapropazone, and trimethazone. Mixtures of these non-steroidal anti-inflammatory agents may also be employed.

Representative examples of steroidal anti-inflammatory drugs include, without limitation, corticosteroids such as hydrocortisone, hydroxyl-triamcinolone, alpha-methyl dexamethasone, dexamethasone-phosphate, beclomethasone dipropionates, clobetasol valerate, desonide, desoximetasone, desoxycorticosterone acetate, dexamethasone, dichlorisone, diflorasone diacetate, diflucortolone valerate, fluadrenolone, fluocinolone acetonide, fludrocortisone, flumethasone pivalate, fluosinolone acetonide, fluocinonide, flucortine butylesters, fluocortolone, fluprednidene (flupred- nylidene) acetate, flurandrenolone, halcinonide, hydrocortisone acetate, hydrocortisone butyrate, methylprednisolone, triamcinolone acetonide, cortisone, cortodoxone, flucetonide, fludrocortisone, diflorasone diacetate, fluradrenolone, fludrocortisone, diflorasone diacetate, fluradrenolone acetonide, medrysone, amcinafel, amcinafide, betamethasone and the balance of its esters, chloroprednisone, chlorprednisone acetate, clocortolone, clescinolone, dichlorisone, difluprednate, flucloronide, flunisolide, fluorometholone, fluperolone, fluprednisolone, hydrocortisone valerate, hydrocortisone cyclopentyl propionate, hydrocortamate, meprednisone, paramethasone, prednisolone, prednisone, beclomethasone dipropionate, triamcinolone, and mixtures thereof.

In still another embodiment, the disclosed compositions are loaded with one or more analgesics, for instance, agents that alleviate pain. Suitable analgesics include, but are not limited to, opioid analgesics such as morphine, hydromorphone, oxymorphone, levorphanol, levallorphan, methadone, meperidine, fentanyl, codeine, dihydrocodeine, oxycodone, hydrocodone, propoxyphene, nalmefene, nalorphine, naloxone, naltrexone, buprenorphine, butorphanol, nalbuphine or pentazocine; a nonsteroidal anti-inflammatory drug (NSAID) such as aspirin, diclofenac, diflunisal, etodolac, fenbufen, fenoprofen, flufenisal, flurbiprofen, ibuprofen, indomethacin, ketoprofen, ketorolac, meclofenamic acid, mefenamic acid, nabumetone, naproxen, oxaprozin, phenylbutazone, piroxicam, sulindac, tolmetin or zomepirac, or a pharmaceutically acceptable salt thereof; a barbiturate sedative, such as amobarbital, aprobarbital, butabarbital, butalbital, mephobarbital, metharbital, methohexital, pentobarbital, phenobarbital, secobarbital, talbutal, thiamylal or thiopental or a pharmaceutically acceptable salt thereof; and a COX-2 inhibitor such as celecoxib, rofecoxib or valdecoxib.

In yet other embodiments, the disclosed compositions are loaded with one or more local anesthetics. Suitable local anesthetics include, but are not limited to, benzocaine, bupivacaine, chloroprocaine, etidocaine, levobupivacaine, lidocaine, mepivacaine, prilocaine, procaine, ropivacaine, and mixtures thereof.

In an embodiment, the composition is free or substantially free of additional bioactive agents (e.g., antibiotics, antifungals, antifungals, and antivirals; growth factors, anti-inflammatory agents, and analgesics). In this aspect, the composition includes less than 0.5% additional bioactive agents. In one embodiment, the composition includes less than 0.1% additional bioactive agents. In another embodiment, the composition includes no additional bioactive agents.

C. Methods of Use

The disclosed compositions described herein can be used, for instance, to deliver biologically active agents to an infection at a site of trauma or surrounding an indwelling medical device, to treat an infection caused by persister bacterial cells, and to treat and/or prevent the formation of biofilm bacteria on an indwelling medical device or surrounding tissue.

Advantageously, the disclosed compositions are administered to a subject and the biologically active agents (for example, chitosan and mannitol, and optionally antibiotics and antifungals) are eluted from the composition in situ. In some embodiments, the biologically active agents continue to be released at an effective level for at least about 3 days. For instance, the biologically active agents may continue to be released at an effective level for at least about 4, 5, 6, 7, 8, 9, or 10 days. In some embodiments, the concentration of biologically active agents released is about 5 µg/mL to about 300 µg/mL per day. In other embodiments, the concentration of biologically active agents released is about 15 µg/mL to about 250 µg/mL per day. In still other embodiments, the concentration of biologically active agents released is about 50 µg/mL to about 200 µg/mL per day. In yet other embodiments, the concentration of biologically active agents released is about 75 µg/mL to about 150 µg/mL per day. In one embodiment, the concentration of mannitol released is about 0.1 mg/mL to about 10 mg/mL, for example, about 0.45 mg/mL to about 6 mg/mL per day.

In some embodiments, the effect of the composition on a subject is compared to a control. For example, the effect of the composition on a particular symptom, pharmacologic, or physiologic indicator can be compared to an untreated subject, or the condition of the subject prior to treatment. In some embodiments, the symptom, pharmacologic, or physiologic indicator is measured in a subject prior to treatment, and again one or more times after treatment is initiated. In some embodiments, the control is a reference level, or an average determined from measuring the symptom, pharmacologic, or physiologic indicator in one or more subjects that do not have the disease or condition to be treated (for example, healthy subjects). In some embodiments, the effect of the treatment is compared to a conventional treatment that is known in the art.

In one embodiment, the present disclosure provides methods of treating pathogen infections, such as bacterial, viral, and fungal infections, at a site of trauma. The site of trauma may include a fracture, an open fracture, a wound, a complex wound, a surgical site, or tissues surrounding the site of injury or trauma. The method includes administering a therapeutically effective amount of the compositions disclosed herein, and optionally any of the biologically active agents described above, to a subject in need thereof. Subjects in need thereof include subjects suffering from, having, susceptible to, or at risk for an infection. For instance, subjects susceptible to or at risk for an infection may include subjects with an indwelling medical device or a subject having or having had a surgical intervention. Determination of those subjects "at risk" can be made by any objective or subjective determination by a diagnostic test or opinion of a health care provider.

Infections that can be treated, prevented, and/or managed by the compositions disclosed herein can be caused by infectious agents including, but not limited to, bacteria, fungi, and viruses. Bacterial diseases caused by bacteria (for example, *Escherichia coli, Klebsiella pneumoniae, Staphylococcus aureus, Enterococcus faecalis, Proteus vulgaris, Staphylococcus viridans*, and *Pseudomonas aeruginosa*) that can be prevented, treated and/or managed in accordance with the methods described herein include, but are not limited to, mycobacteria *rickettsia, mycoplasma, neisseria, S. pneumonia, Borrelia burgdorferi* (Lyme disease), *Bacillus anthracis* (anthrax), tetanus, *streptococcus, staphylococcus, mycobacterium*, pertussis, cholera, plague, diphtheria, *chlamydia, S. aureus* and *legionella*.

Fungal infections that can be prevented, treated and/or managed in accordance with the methods described herein include, but are not limited to, *Candida* infections, zygomycosis, *Candida* mastitis, progressive disseminated trichosporonosis with latent trichosporonemia, disseminated candidiasis, pulmonary paracoccidioidomycosis, pulmonary aspergillosis, *Pneumocystis carinii* pneumonia, cryptococcal meningitis, coccidioidal meningoencephalitis and cerebrospinal vasculitis, *Aspergillus niger* infection, *Fusarium* keratitis, paranasal sinus mycoses, *Aspergillus fumigatus* endocarditis, tibial dyschondroplasia, *Candida glabrata* vaginitis, oropharyngeal candidiasis, X-linked chronic granulomatous disease, *Tinea pedis*, cutaneous candidiasis, mycotic placentitis, disseminated trichosporonosis, allergic bronchopulmonary aspergillosis, mycotic keratitis, *Cryptococcus neoformans* infection, fungal peritonitis, *Curvularia geniculata* infection, staphylococcal endophthalmitis, sporotrichosis, and dermatophytosis.

Viral diseases that can be prevented, treated and/or managed in accordance with the methods described herein include, but are not limited to, those caused by hepatitis type A, hepatitis type B, hepatitis type C, influenza (e.g., influenza A or influenza B), varicella, adenovirus, herpes simplex type I (HSV-I), herpes simplex type II (HSV-II), rinderpest, rhinovirus, echovirus, rotavirus, respiratory syncytial virus, papilloma virus, papova virus, cytomegalovirus, echovirus, arbovirus, hantavirus, coxsackie virus, mumps virus, measles virus, rubella virus, polio virus, small pox, Epstein Barr virus, human immunodeficiency virus type I (HIV-I), human immunodeficiency virus type II (HIV-II), and agents of viral diseases such as viral meningitis, encephalitis, dengue or small pox.

In another embodiment, the present disclosure provides methods for treating a subject having an infection caused by persister bacterial cells. As discussed above, persister bacterial cells are not responsive to antibiotics. However, it has been discovered that the disclosed compositions provide improved targeting of persister cells within bacterial or fungal biofilm. In this aspect, the method includes administering a therapeutically effective amount of the compositions disclosed herein, and optionally any of the biologically active agents described above, to a subject in need thereof.

In some embodiments, the disclosed compositions are administered in a therapeutically effective amount to reduce the number of persister bacterial cells at the site of an infection. In some embodiments, the disclosed compositions reduce the number of persister bacterial cells at a site of infection by at least about 30 percent when compared to an untreated control site. For instance, the disclosed compositions lead to direct and/or indirect reduction in the number of persister bacterial cells at a site of infection by at least about 40%, 50%, 60%, 70%, 80%, 90%, or more than 90% when compared to an untreated control site.

In still another embodiment, the present disclosure provides methods of treating and/or preventing the formation of biofilm bacteria on an indwelling medical device or at the site of trauma. In some embodiments, the method includes administering a therapeutically effective amount of the compositions disclosed herein, and optionally any of the biologically active agents described above, to a subject in need thereof. In other embodiments, the step of administering includes contacting a surface of the indwelling medical device with a therapeutically effective amount of the compositions disclosed herein, and optionally any of the biologically active agents described above. The term "contacting" is meant to broadly refer to bringing a bacterial cell and the disclosed compositions into sufficient proximity such that the disclosed compositions can exert their effects on any bacterial cell present. The indwelling medical device may be contacted with the therapeutically effective amount either before surgical placement (for example, by coating or applying on the device) or after surgical placement and closure of the incision (for example, by injection).

In this aspect, the disclosed compositions are administered in a therapeutically effective amount to reduce biofilm bacteria present on the indwelling medical device and in the surrounding tissue or bone. In some embodiments, the disclosed compositions lead to direct and/or indirect reduction of biofilm bacteria present on the indwelling medical device and in the surrounding tissue or bone by at least about 30 percent when compared to an untreated control site. For instance, the disclosed compositions lead to direct and/or indirect reduction of biofilm bacteria present on the indwelling medical device and in the surrounding tissue or bone by at least about 40%, 50%, 60%, 70%, 80%, 90%, or more than 90% when compared to an untreated control site.

In some embodiments, the methods disclosed herein achieve one or more of the following effects in subjects that are administered the compositions of the present disclosure: reduction or amelioration of the severity of an infection or symptom associated therewith; reduction in the duration of an infection or symptom associated therewith; prevention of the progression of an infection or symptom associated therewith; regression of an infection or symptom associated therewith; prevention of the development or onset of an infection or symptom associated therewith; prevention of the recurrence of an infection or symptom associated therewith; reduction or prevention of the spread of an infectious agent from one cell to another cell, one tissue to another tissue, or one organ to another organ; prevention or reduction of the spread/transmission of an infectious agent from one subject to another subject; reduction in organ failure associated with an infection; reduction in the hospitalization of a subject; reduction in the hospitalization length; an increase in the survival of a subject with an infection; elimination of an infection; inhibition or reduction in replication of an infectious agent; inhibition or reduction in the entry of an infectious agent into a cell(s); inhibition or reduction in the assembly of infectious agents; inhibition or reduction in the release of infectious agents from a cell(s); reduction in the number or titer of an infectious agent; and prevention of the onset or progression of a secondary infection associated with an infection.

D. Other Uses

As described herein, the disclosed compositions have a number of advantages and improved properties. The compositions disclosed herein are in no way limited to application at surgical sites and sites of trauma. For instance, the disclosed compositions have applicability in combat trauma, dentistry, oral hygiene products, respiratory therapies, gastrointestinal applications, and industrial applications. In other embodiments, the disclosed compositions may be useful in bioprinting and additive manufacturing implementation after showing shear thinning properties upon injection and having complex gel-like properties.

E. Examples

Example 1: Synthesis of Disclosed Mannitol-Chitosan-PEG Compositions

The following is an exemplary method for forming a chitosan, polyethylene glycol (PEG), and mannitol composition according to the present disclosure. PEG, specifically, 1% weight/volume (w/v) 8000 g/mol PEG (Sigma Aldrich, St. Louis, MO) was dissolved in 0.85% acetic acid in deionized water solution. Following dissolution, 1% w/v of chitosan (Chitopharm S chitosan powder, Chitinor AS, Tromsø, Norway) with an 82.46±1.679 degree of deacetylation and an average molecular weight of 250.6 kDA was dissolved in the same solution. Following, 2% w/v of mannitol (Bulksupplements.com) was also dissolved in solution to form the composition. The solutions were cast into dishes and left to dry to form thin films. These films were then ground separately into a fine powder and stored in a desiccator until use. The powder was hydrated with phosphate buffered saline solution (PBS). The addition of PBS in the amount of 2.50 mL/gram of composition powder was observed to yield paste with favorable viscosity and mixing.

A paste form was achieved by filling a 10 mL syringe with 1 gram of ground paste and attaching it to a 3 mL syringe filled with 2.5 mL of PBS via an Interlok® (Qosina) coupler. The PBS hydrated the ground paste powder and the two parts were pushed back and forth until a consistent texture was reached. Antibiotics can be added to the PBS solution used to hydrate the powder to form a composition loaded with physician-selected antibiotics capable of actively eluting until day 7.

Figure 1B:
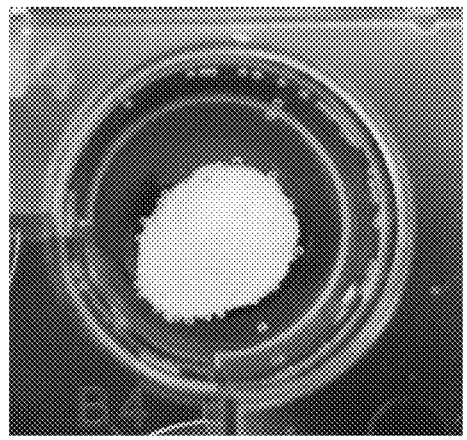

Unexpectedly, an injectable gel-like complex was formed that is capable of conforming to complex geometries and adhering to negatively charged (e.g., metallic) surfaces. The paste maintained the ejection morphology and position after submersion in a saline solution or water. FIG. 1A shows the paste after injection, while FIG. 1B shows the paste after submersion for 3 days.

Example 2: Injectability Studies

Materials and Methods

An injectability test of the disclosed mannitol-chitosan-PEG composition (ChMPEG) and a control paste, chitosan-PEG paste (Ch-PEG), was performed through a 1 mL syringe and through an 18 G needle (BD Products). The force required to eject the paste from both the 1 mL syringe (n=3) and the 18 G needle (n=4) was assessed using an Instron Universal Testing Machine with a 5 kN load cell force plate for each paste composition. The 1 mL syringe was loaded with 1.0 mL of paste and the syringe with the 18 G needle was loaded with 0.5 mL of paste. The ejection force was automated by Instron's Bluehill 2 Software, while compressing the syringe plunger at 1 mm/sec for a specified length, 50 mm for 1 mL syringe and 25 mm for the syringe with 18 G needle. The maximum force detected was used for comparison between paste groups. SigmaPlot was used to statistically analyze the data to determine if the pastes were significantly different.

Results

The results of the injectability test are indicated in Table 1 below. Table 1 shows the average force needed to eject each paste group from either a 1 mL syringe (n=3) or a 1 mL syringe with an 18G needle (n=4). The ** indicates a statistical difference between the groups.

TABLE 1

| Average Force for Ejection of Each Paste Group | | |
|---|---|---|
| Paste Group | 1 mL syringe | 18 G needle + 1 mL syringe |
| ChMPEG | 1.20N ± 0.20N | 18.85N ± 0.70N ** |
| Ch-PEG (control) | 1.82N ± 0.38N | 3.92N ± 1.64N ** |

As can be seen in Table 1, no significant difference was detected between the different paste groups during the 1 mL syringe (no needle) injectability test. However, for the test with the 18 G needle, the ChMPEG and Ch-PEG pastes were statistically different.

Example 3: Adhesion Testing

Materials and Methods

An adhesion test of the ChMPEG compositions and Ch-PEG pastes (used as a control) was performed to test the adhesivity of the pastes. Using the Instron Universal Testing machine, a stainless steel K-wire was submerged within 1.5 mL of paste (n=5) for 5 seconds and the maximum force required to pull the K-wire out of the paste was evaluated by the Instron's Bluehill 2 Software at a rate of 1 mm/sec in tension.

Results

The results of the adhesion testing are shown in Table 2 below. Table 2 shows the maximum tensile force required to remove 2 cm of the stainless steel K-Wire from the two different paste groups (n=5). The ** indicates a statistical difference from the control paste.

TABLE 2

| Maximum Tensile Force to Remove K-Wire | |
| --- | --- |
| Paste Group | Maximum Tensile Force |
| ChMPEG | 0.484 ± 0.081N ** |
| Ch-PEG (control) | 0.179 ± 0.024N |

The ChMPEG composition was statistically different from the chitosan paste alone (Ch-PEG). As can be seen from Table 2, the ChMPEG paste group needed a greater force to remove the K-wire after being inserted. Additionally, it was observed that paste material adhered to the surface after removing from the mannitol blend, compared to non-adhered material for blends without mannitol. It was also observed that the mannitol blend had a visible depression in the material.

Example 4: Degradation Profile

Materials and Methods

In vitro enzymatic degradation studies were performed to show how the ChMPEG compositions and Ch-PEG pastes would biodegrade. Each paste type was hydrated in PBS and approximately 0.3 mL (n=3) of hydrated paste was placed in a 5 mL working volume petri dish (Nunclon). The degradation solution was prepared by dissolving 1 mg/mL lysozyme type VI (MP Biomedicals) and 100 µg/mL Normocin antibiotic/antimycotic in PBS. Five mL of degradation solution was added to the petri dish and samples were placed in a 37° C. incubator. Degradation solution was refreshed every other day by aspirating the media and adding 5 mL of fresh solution. Samples were collected at the following time points: 1, 3, 5, 7, and 14 days. Degradation solution was siphoned off and the samples were placed in an oven at 45° C. After drying, the samples were weighed and compared to their initial weight to determine the degradation rate. Different samples were used for each time point.

Results

Figure 2:
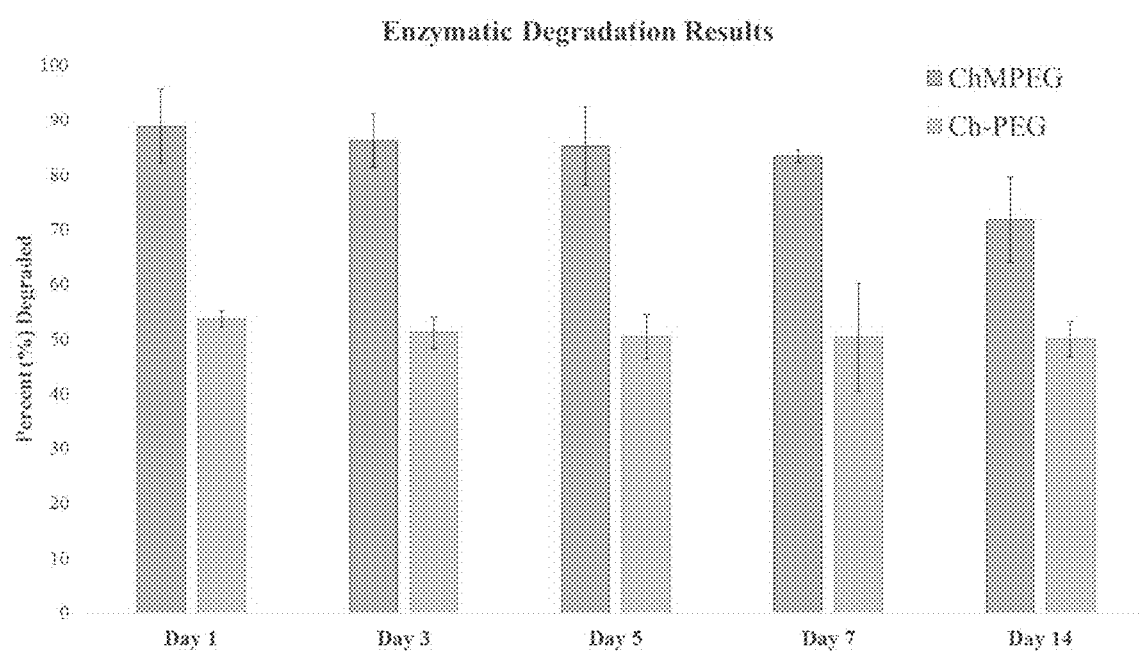
FIG. 2 is a graphical representation of enzymatic degradation results for ChMPEG and Ch-PEG pastes (n=3) with a 1 mg/mL lysozyme type VI solution over a 14 day period. Five distinct times points were taken and the error bars indicate standard deviation.

The enzymatic degradation results are shown in FIG. 2. FIG. 2 is graphical representation of enzymatic degradation results for the ChMPEG compositions and Ch-PEG pastes (n=3) with a 1 mg/mL lysozyme type VI solution over a 14 day period. Five distinct times points were taken and the error bars indicate standard deviation. As can be seen in FIG. 2, the ChMPEG paste continued to degrade over the 14 day period, only reaching around 30% degraded, while the Ch-PEG paste without mannitol reached a plateau after the first day, remaining stagnant at 50% degraded through day 14.

Example 5: Elution Profiles

Materials and Methods

Antibiotics were passively loaded into the ChMPEG compositions and Ch-PEG pastes by replacing the PBS solution described in Example 1 with a solution of vancomycin and amikacin, both at a 10 mg/mL concentration, in PBS. The pastes (0.3 mL, n=3) were injected into a 12 well CELLCROWN insert fitted with a 44 µm nylon filter and submerged in 4 mL of PBS. Sampling occurred daily for 7 days with complete refreshment. Antibiotic concentrations were evaluated with high performance liquid chromatography using a ThermoScientific Dionex Ultimate 3000 Series HPLC system and a BDS Hypersil reversed-phase C18 column (150×4.6 mm). Vancomycin was detected with a UV/Vis spectrophotometer and amikacin was quantified using pre-column derivatization with an o-phthaldialdehyde reagent and subsequent detection using a fluorescence detector. Mannitol was detected using a charged aerosol detector.

Results

Figure 3:
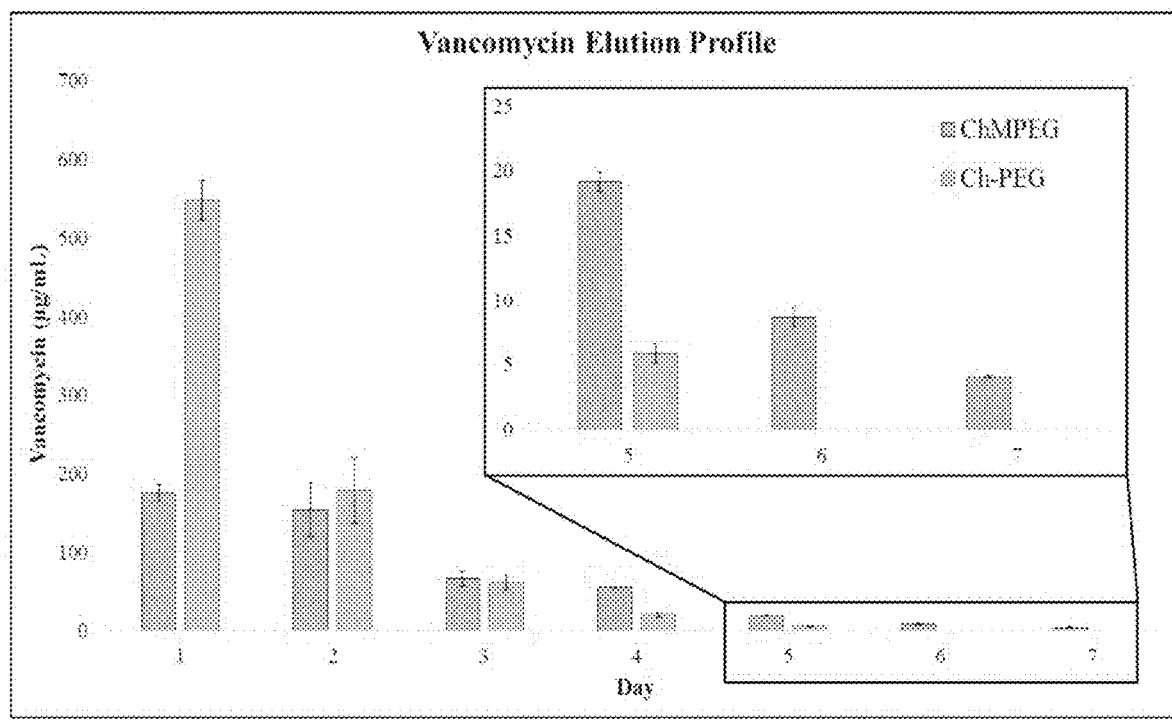
FIG. 3 is a graphical representation showing the mean elution concentration of vancomycin detected for each paste group (n=3) over a week. Zoomed in graphs illustrate the elution data for days 5-7 with the error bars indicating standard deviation.
Figure 4:
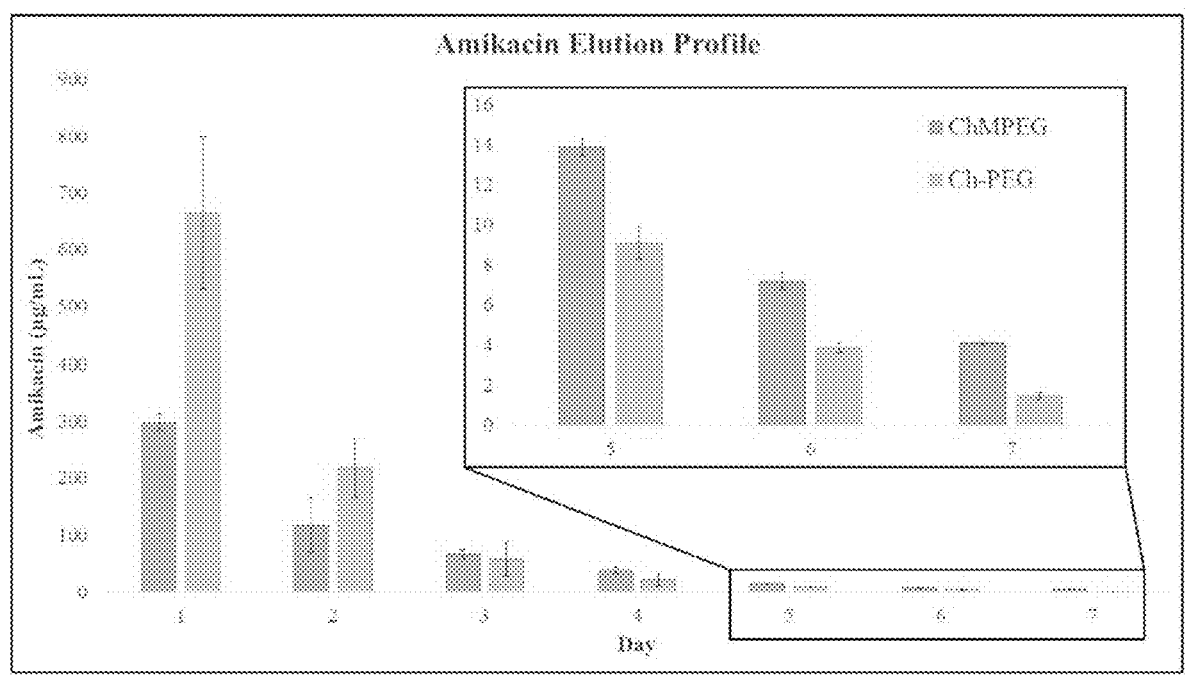
FIG. 4 is a graphical representation showing the mean elution concentration of amikacin detected for each paste group (n=3) over a week. Zoomed in graphs illustrate the elution data for days 5-7 with the error bars indicating standard deviation.
Figure 5:
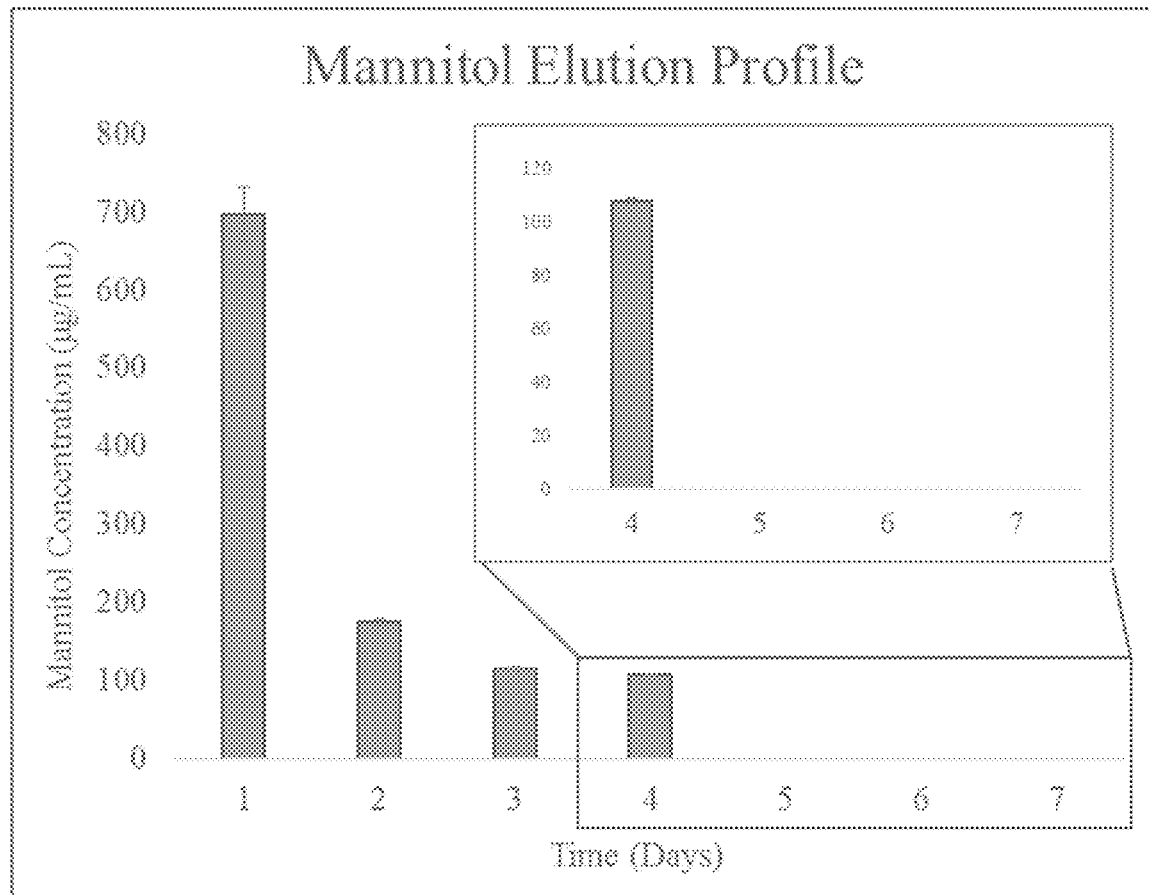
FIG. 5 is a graphical representation showing the mean elution concentration of mannitol detected for ChMPEG paste group (n=3) over a week. Zoomed in graphs illustrate the elution data for days 4-7 with the error bars indicating standard deviation.

The average daily elution concentrations for vancomycin, amikacin, and mannitol are displayed in FIGS. 3, 4, and 5, respectively. FIG. 3 is a graphical representation showing the mean elution concentration of vancomycin detected for each paste group (n=3) over a week. The zoomed in portion of FIG. 3 illustrates the elution data for days 5-7 with the error bars indicating standard deviation. FIG. 4 is a graphical representation showing the mean elution concentration of amikacin detected for each paste group (n=3) over a week. The zoomed in portion of FIG. 4 illustrates the elution data for days 5-7 with the error bars indicating standard deviation. FIG. 5 is a graphical representation showing the mean elution concentration of mannitol detected for the mannitol-chitosan paste group (n=3) over a week. The zoomed in portion of FIG. 5 illustrates the elution data for days 4-7 with the error bars indicating standard deviation.

As can be seen in FIGS. 3 and 4, each paste group had similar release kinetics, demonstrating a burst release. The ChMPEG composition eluted both vancomycin and amikacin at detectable levels for 7 days, compared to the Ch-PEG paste, which was only able to elute detectable levels of amikacin for 7 days. However, no statistical differences were seen between the two groups. As shown in FIG. 5, mannitol eluted in a similar profile, with minimal but detectable release until day 7.

Example 6: Antimicrobial & Antibiofilm Activity

Materials and Methods

Activity of antibiotics in eluate samples (n=3) of ChMPEG and Ch-PEG was assessed using a zone of inhibition (ZOI) assay. Trypticase soy agar plates with *Staphylococcus aureus* (UAMS-1) were utilized for one study. A separate study with *Pseudomonas aeruginosa* lawns was performed. Both were inoculated with 100 µL of a $10^6$ colony forming unit (CFU) concentration. Eluate samples from days 1-7 (30 µL) were loaded on to blank paper discs (6 mm=diameter, BD Products) and placed on the bacterial lawns and allowed to incubate at 37° C. for 24 hours. The plates were then photographed and ZOI diameters were measured using ImageJ (NIH).

Results

Figure 6:
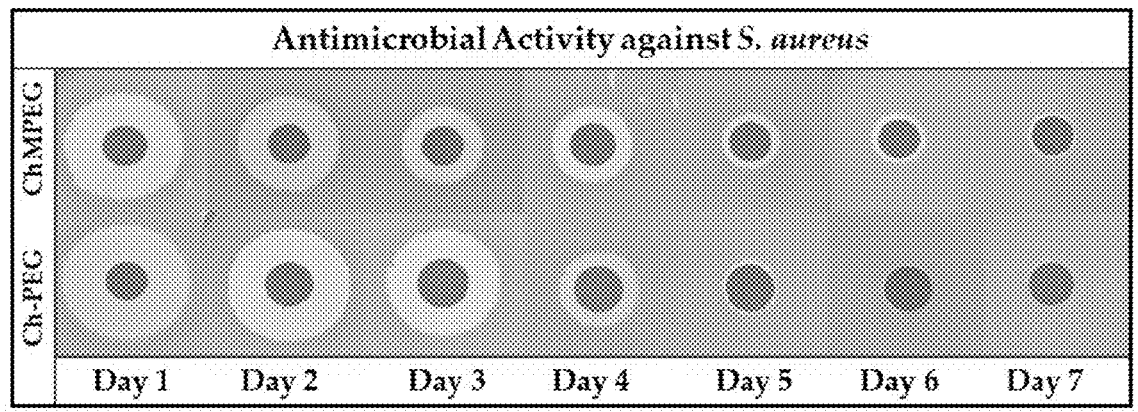
FIG. 6 is a graphical table illustrating representative images of the ZOI against *S. aureus* created around the 6 mm paper discs loaded with different paste eluate samples from day 1 through day 7.

FIG. 6 shows representative images of the ZOI against *S. aureus* created around the 6 mm paper discs loaded with different paste eluate samples from day 1 through day 7. Table 3 below displays the average ZOI measured with ImageJ (NIH) for each paste type for each eluate sample day (n=9) against *S. aureus*. The ± indicates standard deviation.

TABLE 3

Average ZOI against *S. aureus*
ZOI against *S. aureus*

| Paste Group | ChMPEG | Ch-PEG |
|---|---|---|
| Day 1 | 5.31 ± 0.19 mm | 6.18 ± 0.16 mm |
| Day 2 | 4.37 ± 0.31 mm | 4.92 ± 0.29 mm |
| Day 3 | 2.92 ± 0.19 mm | 1.99 ± 0.08 mm |
| Day 4 | 2.40 ± 0.20 mm | 0.42 ± 0.19 mm |
| Day 5 | 1.18 ± 0.17 mm | 0 mm |
| Day 6 | 0.61 ± 0.32 mm | 0 mm |
| Day 7 | 0.22 ± 0.04 mm | 0 mm |

The results of the ZOI study against *S. aureus* (FIG. 6 and Table 3) indicate the ChMPEG paste was able to produce measurable zones until day 7, while the Ch-PEG paste only had measurable zones until day 4.

Figure 7:
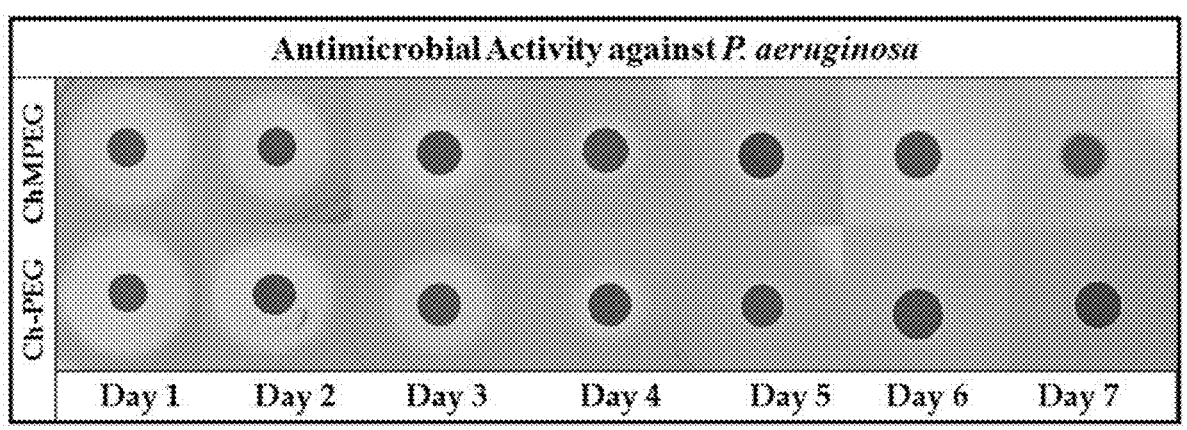
FIG. 7 is a graphical table illustrating representative images of the ZOI against *P. aeruginosa* created around the 6 mm paper discs loaded with different paste eluate samples from day 1 through day 7.

FIG. 7 shows representative images of the ZOI against *P. aeruginosa* created around the 6 mm paper discs loaded with different paste eluate samples from day 1 through day 7. Table 4 below displays the average ZOI measured with ImageJ (NIH) for each paste type for each eluate sample day (n=9) against *P. aeruginosa*. The ± indicates standard deviation.

TABLE 4

Average ZOI against *P. aeruginosa*
ZOI against *P. aeruginosa*

| Paste Group | ChMPEG | Ch-PEG |
|---|---|---|
| Day 1 | 6.26 ± 0.24 mm | 6.69 ± 0.28 mm |
| Day 2 | 4.79 ± 0.38 mm | 5.38 ± 0.84 mm |
| Day 3 | 2.98 ± 0.37 mm | 3.70 ± 0.46 mm |
| Day 4 | 1.84 ± 0.29 mm | 2.00 ± 0.26 mm |
| Day 5 | 0.45 ± 0.14 mm | 0 mm |
| Day 6 | 0.31 ± 0.07 mm | 0 mm |
| Day 7 | 0 mm | 0 mm |

For the ZOI study against *P. aeruginosa* (FIG. 7 and Table 4), the ChMPEG paste was able to show measurable zones until Day 6, with the Ch-PEG paste only showing measurable zones until Day 4.

Any ZOI average measuring below 0.2 mm was reported as 0 mm. These results coincide with the elution profiles measured for the different antibiotics and could also be attributed to the addition of mannitol acting as a metabolite and increasing the efficacy of the antibiotics.

Example 7: In Vitro Biofilm Studies

Materials and Methods

Figure 8:
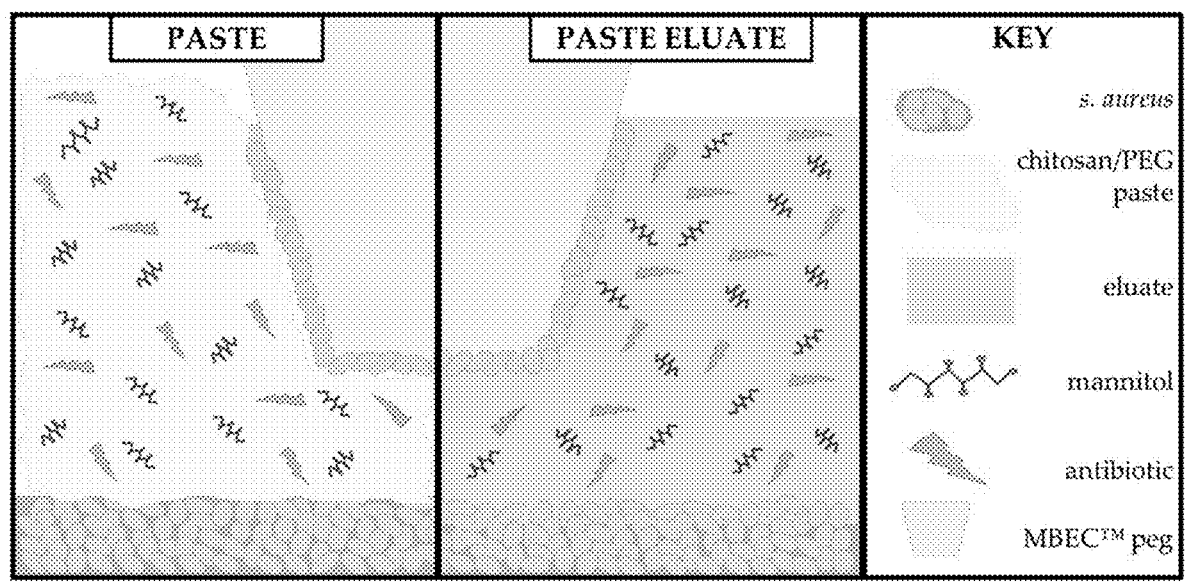
FIG. 8 is a schematic diagram of the in vitro biofilm assays done using the MBEC™ peg plates after a *S. aureus* biofilm was grown for 48 hours. The biofilm was submerged in either day one paste eluate or the different paste groups directly, with and without antibiotics.

The two paste groups, Ch-PEG and ChMPEG-2, were hydrated with 5 mg/mL amikacin and vancomycin and evaluated against established biofilms of *S. aureus* (UAMS-1) grown overnight in MBEC™ 96 well plates in 150 μL of TSB. After 48 hours, pegs of the MBEC™ plates were fitted into a new 96 well plate after 0.15 mL (n=6) of each paste type was injected into the well. Additionally, eluate activity was evaluated by submerging the pegs in 150 μL (n=6) of the first day eluate sample taken from the elution study. Controls of 0, 0.05, 0.5, and 5 mg/ml of vancomycin and amikacin in PBS were also included as negative and positive controls. After 24 hours, the tops of the MBEC™ plates were removed, placed in fresh TSB, sonicated for 5 minutes, and incubated for 24 hours. PRESTO BLUE™ viability reagent was used to compare bacterial survival on pegs and growth after exposure to paste or eluates. Percent viability was determined using the blank standard (0 mg/ml antibiotic). FIG. 8 depicts a schematic diagram of this study.

Results

Figure 9A:
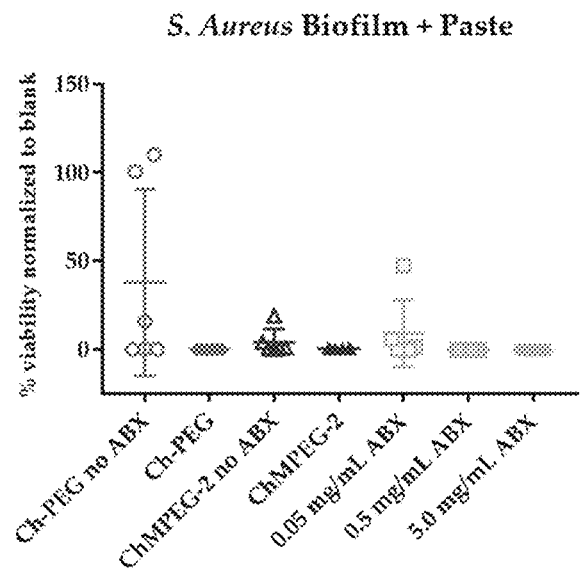
FIG. 9A is a scatterplot representing bacterial viability of *S. aureus* after direct contact with the pastes (n=6)
Figure 9B:
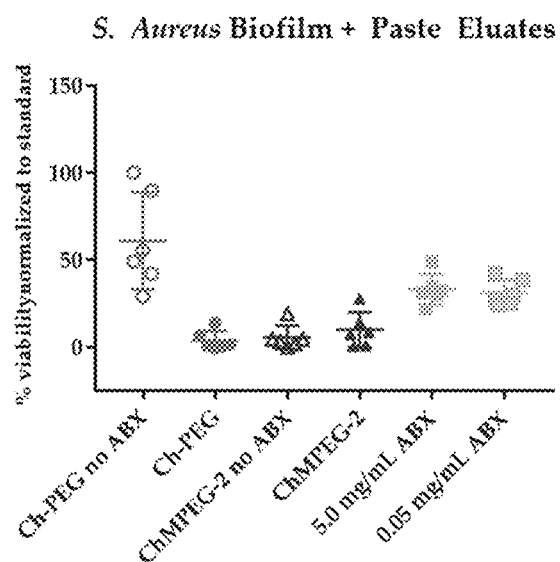
FIG. 9B is a scatterplot representing bacterial viability after direct contact with day-one eluates of paste (n=6). Bacterial viability was normalized to a blank standard. The abbreviation ABX indicates antibiotics.

FIG. 9A is a scatterplot showing bacterial viability of *S. aureus* after direct contact with the pastes (n=6). FIG. 9B is a scatterplot showing bacterial viability after direct contact with day-one eluates of paste (n=6). Each paste group, except the Ch-PEG paste with no antibiotics, decreased bacterial viability after 24 hours of incubation after the *S. aureus* biofilm was submerged in paste (FIG. 9A). For the paste eluate study, all groups except Ch-PEG no antibiotics, showed a decrease in bacterial viability (FIG. 9B). The addition of mannitol, for the groups with and without antibiotics, showed a decrease in bacterial viability, although no statistical difference was seen.

Example 8: Ex Vivo Biofilm Study on Rabbit Bone

Materials and Methods

Figure 10:
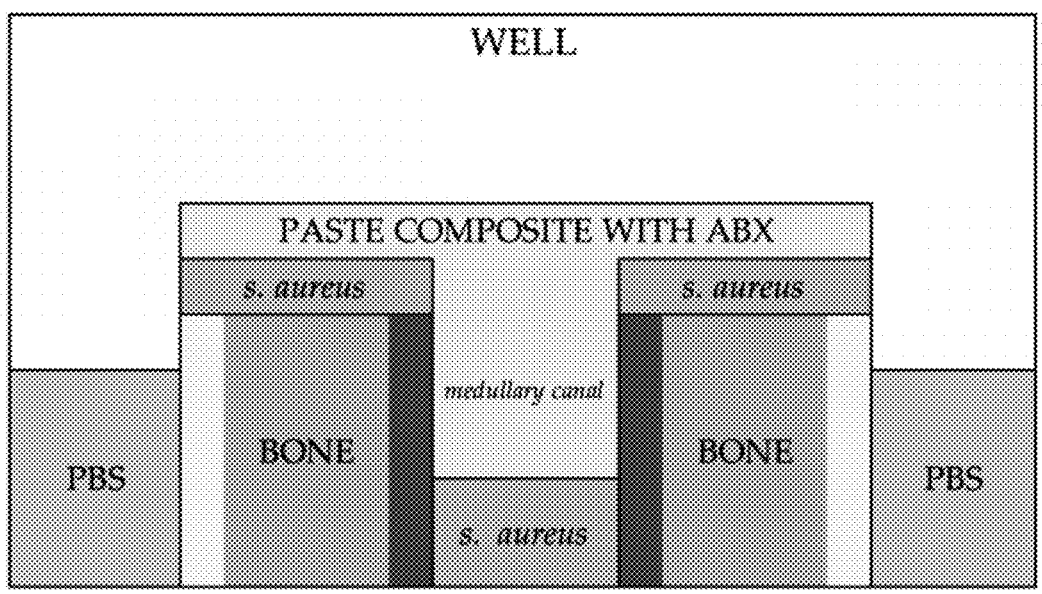
FIG. 10 is an illustration of the ex vivo osteomyelitis prevention model using harvested rabbit bone tissue and *S. aureus* (UAMS-1) as the pathogen.

Bone was harvested from the femur, tibia, and humerus of male New Zealand white rabbits under aseptic conditions and cut into small 0.5 cm long cylinders, as an adaptation of the in vivo model described by Badha et al, *Journal of bone and joint infection*, 2019 4(1):1. Bone samples were placed into 12 well plates with 500 μL of PBS and inoculated with 100 μL of 105 colony forming unit (CFU) concentration of *S. aureus* (UAMS-1). Pastes, including Ch-PEG and ChMPEG-2 (0.3 mL, n=3), were injected into the medullary canal and on top of the bone sample, then incubated overnight at 37° C. A cross-sectional schematic diagram of this in vitro model can be seen in FIG. 10. The paste was removed and the bone was placed in 2.50 mL of PBS to be sonicated for 5 minutes. The resulting solution was used to quantify bacterial presence by CFU counts.

Results

Figure 11:
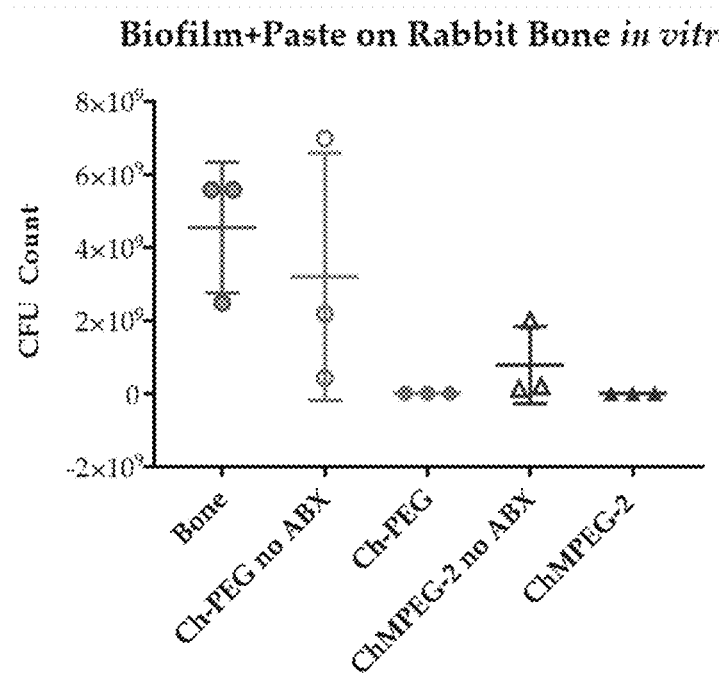
FIG. 11 is a scatterplot showing the CFU counts for *S. aureus* (UAMS-1) from rabbit bone incubated for 24 hours with direct contact of ChMPEG-2 and Ch-PEG pastes, both with and without antibiotics (ABX) (n=3).

FIG. 11 is a scatterplot showing the CFU counts for *S. aureus* (UAMS-1) from rabbit bone incubated for 24 hours with direct contact of ChMPEG-2 and Ch-PEG pastes, both with and without antibiotics. As can be seen in FIG. 11, both paste groups loaded with antibiotics reduced mean viability of an *S. aureus* biofilm, though differences were not significant at the alpha=0.05 level (p=0.07).

Example 9: In Vitro Cytocompatibility

Materials and Methods

NIH-3T3 fibroblasts were seeded at $10^4$ cells/cm$^2$ in a 24 well plate and grown in Dulbecco's Modified Eagle's Medium supplemented with 10% fetal bovine serum and 100 μg/mL of Normocin antibiotic/antimitotic solution for 24 hours at 37° C. and 5% 002. The ChMPEG and Ch-PEG paste types (n=3) were compared to a neutral chitosan sponge and blank wells. Samples were sterilized with ethylene oxide gas (EtO) prior to testing. The pastes were hydrated with PBS and a volume of 0.2 mL was inserted into cell culture inserts (Falcon, pore size=8 µm). Cell viability was quantified using Cell-Titer Glo (Promega) after 24 hours of exposure to the pastes.

Results

Figure 12:
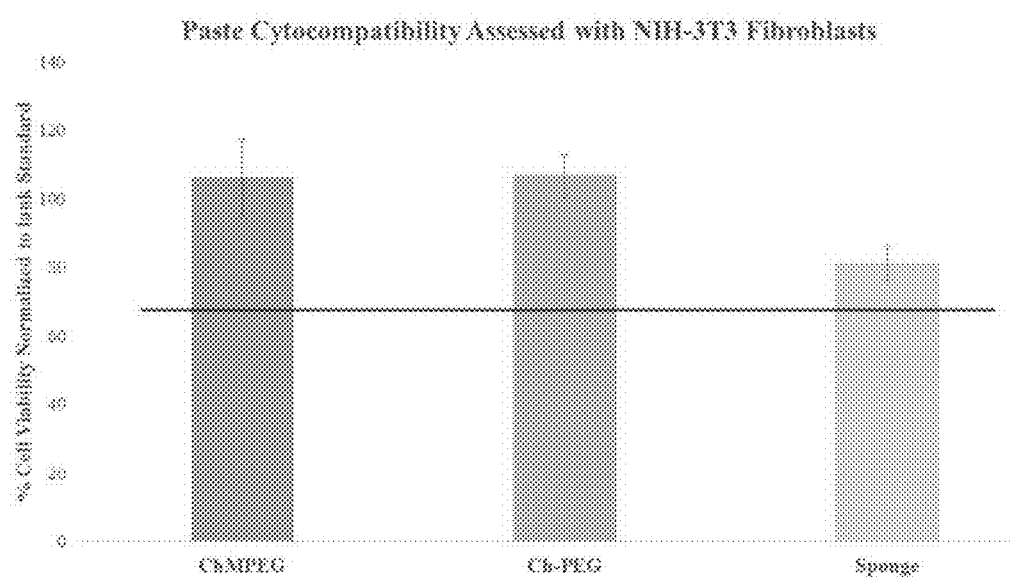
FIG. 12 is a graph representing cytocompatibility results for each paste type when evaluated with NIH-3T3 fibroblasts cells. Error bars indicate standard deviation and the bar line represents the accepted value of 70% according to ISO 109935.

FIG. 12 shows the cytocompatibility results for each paste type when evaluated with NIH-3T3 fibroblasts cells. As can be seen in FIG. 12, all paste types and the control sponge were above the threshold 70% value when normalized to the blank standard, in accordance with the ISO 109935 Biological Evaluations of Medical Devices standard when evaluating biomaterials against fibroblasts and the groups were not statistically different from one another.

Example 10: Biocompatibility Model with Sprague-Dawley Rats

Materials and Methods

This animal model was approved by the Institutional Animal Care and Use Committee (IACUC) at the University of Memphis. Sixteen Male Sprague Dawley Rats (~375 g) were divided into 2 groups: ChMPEG paste and Ch-PEG paste, at two time points (1 week and 4 weeks) (n=8/group/time point). Rats were anesthetized using isoflurane inhalation with their backs shaved and cleaned with betadine and isopropanol. Each rat received both implant groups, inserted at separate and randomized locations on its back with the midline separating the groups. Pastes hydrated with PBS (0.3 mL) were placed subcutaneously after an approximately 1 cm long incision was made, and surgical scissors were used to create the subcutaneous pouch. Following the two time points, rats were sacrificed and the skin tissue surrounding the remaining material was harvested for histological analysis with H&E staining. Reviewers blinded to group identification (n=5) rated inflammation on a scale of zero to five with zero indicating no inflammation and five indicating severe inflammation. Inflammation was assessed grading the severity of the fibrous capsule and the reaction zone surrounding the implant, with increased visible purple nuclei correlating to an increase in the presence of the host's immune cells.

Results

Figure 13A:
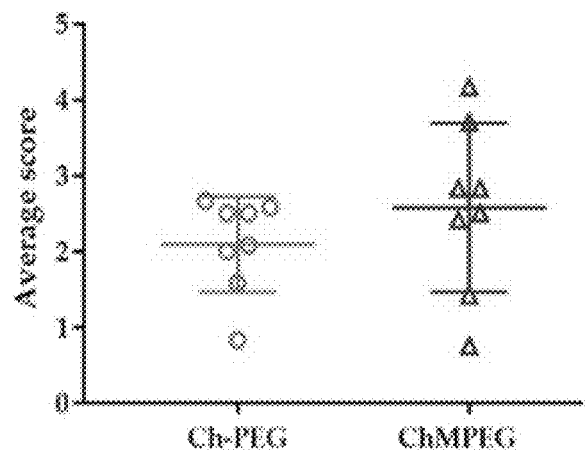
FIGS. 13A and 13B are scatterplots showing mean histological scores for each rat (n=8) in a biocompatibility model.
Figure 13B:
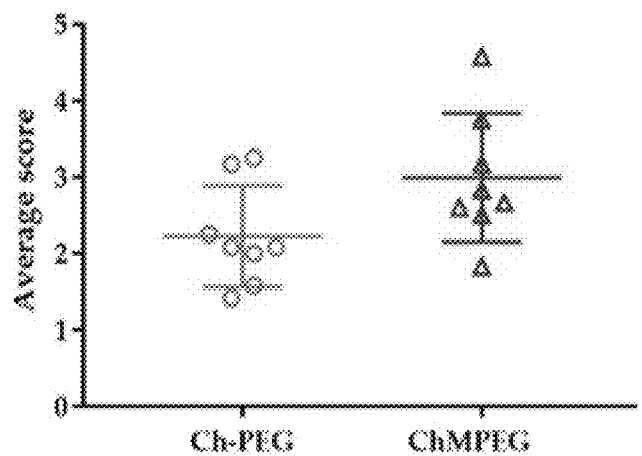

FIGS. 13A and 13B are histological scores for each rat in the biocompatibility model. The histological scores shown in FIGS. 13A and 13B by five blinded raters indicate a greater inflammatory response in the ChMPEG-2 paste group when compared to the Ch-PEG, but not a statistically different response.

Figure 14:
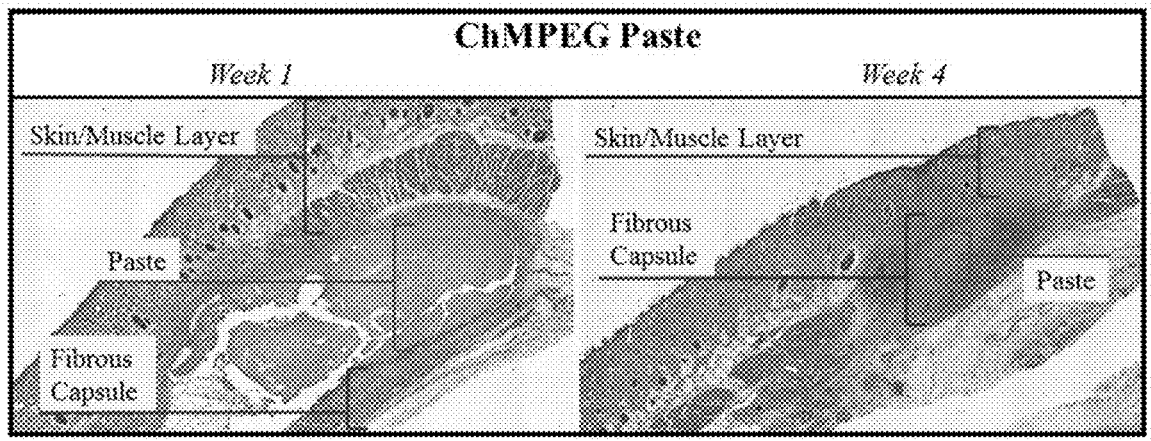
FIG. 14 illustrates representative histological images of ChMPEG paste from a biocompatibility with male Sprague-Dawley rats from two time points, week 1 and 4. Samples were stained with H&E.
Figure 15:
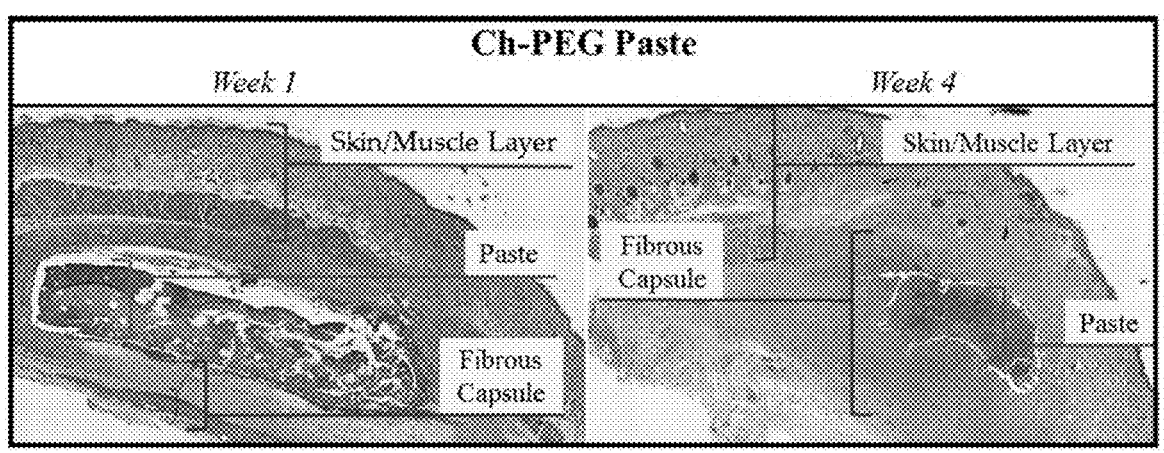
FIG. 15 illustrates representative histological images of Ch-PEG paste from a biocompatibility study with male Sprague-Dawley rats from two time points, week 1 and 4. Samples were stained with H&E.

FIG. 14 shows representative histological images of ChMPEG paste from a biocompatibility with male Sprague-Dawley rats from two time points, week 1 and 4 and FIG. 15 shows representative histological images of Ch-PEG paste from a biocompatibility with male Sprague-Dawley rats from two time points, week 1 and 4. Representative histological sections of each paste group showed that paste groups elicited mild to moderate inflammation in the rat biocompatibility model.

Although the paste was still present at week 4, there were signs of paste degradation that could account for the slightly increased inflammatory response seen in both paste groups due to the acidic degradation products of chitosan. Overall, the inflammatory response was mild and in the context of an infection, an active inflammatory response with macrophage and neutrophil presence is required for the body's innate immune response to remain active at creating an environment unsuitable for biofilm growth or the release of planktonic bacteria.

Example 11: Osteomyelitis Model in New Zealand White Rabbits

Materials and Methods

Figure 16:
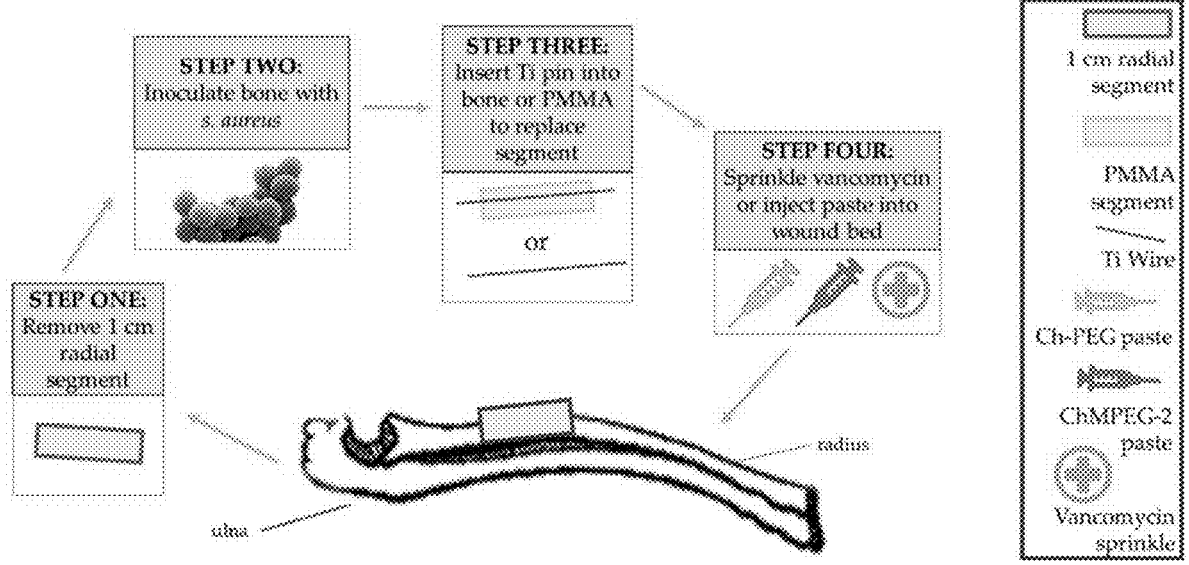
FIG. 16 is a diagram of the osteomyelitis rabbit model used to evaluate the efficacy of the different paste groups (ChMPEG and Ch-PEG) on the ability to prevent an osteomyelitis infection and biofilm formation on the titanium pin inserted into the bone defect.

This animal model was approved by the IACUC at the University of Arkansas Medical Sciences with all appropriate measures taken to minimize pain and discomfort. This in vivo model is an adaptation of the work by Smeltzer et al *J Orthop Res*, 1997 15(3):414-21. Female New Zealand White rabbits weighing 2-3 kg were divided into 5 groups (n=6/group) including the following: no treatment control, a hollow PMMA (Orthoset, MicroPort Memphis, TN) cylinder with amikacin and vancomycin (approximately 15 mg/implant), a vancomycin sprinkle of 10 mg, the Ch-PEG paste, and the ChMPEG paste. Rabbits were anesthetized with 1-2 cc of a xylazine/ketamine mixture intramuscularly for a dose range of 3-7 mg/kb xylazine and 30-40 mg/kg ketamine. Rabbits were maintained on isoflurane administered by nose cone to produce surgical anesthesia and monitored by a veterinary technician. The right forelimb of each rabbit was shaved and prepped using a betadine scrub and rinsed with 70% ethanol. An incision was made on the anterior surface of the right forelimb through the epidermis, musculature, and fascia until the radius was exposed. A 1 cm mid-radial segment was excised from the right radial bone using a miniature saw blade (Exakt, Oklahoma City, OK). The excised segment was then infected by inoculation of *S. aureus* [10 µL of $10^6$ colony forming units (CFUs)/mL; UAMS-1 strain] directly into the intramedullary canal on both the proximal and distal ends of the radius. A titanium pin (0.9 mm diameter, 2 cm length) was placed back into the defect via the medullary canal. However, for the PMMA group, the bone segment was left out and the titanium pin was inserted into the hollow PMMA cylinder to be placed back into the defect. Rabbits were euthanized after 3 weeks with swabs of bone and surrounding soft tissue was taken for analysis of present microorganisms, and the pin retrieved and sonicated in PBS for bacteriological analysis. All of the groups included in this study, minus the no treatment group, contained antibiotics. FIG. 16 displays a graphical representation of the osteomyelitis rabbit model.

Following sacrifice of animals, the bone and surrounding tissue were harvested and preserved in a 10% neutral formalin solution. Tissue samples were decalcified with formic acid, embedded in paraffin, sectioned into 5 µm slices, and stained with hematoxylin and eosin (H&E).

Results

Both paste groups were capable of implant biofilm formation by *S. aureus* in the context of the rabbit osteomyelitis model. FIG. 17 shows the CFU counts of *S. aureus* collected from the harvested titanium pin of each rabbit. CFU counts obtained from the titanium pin collected after three weeks indicated only the Ch-PEG and ChMPEG groups were able to inhibit bacteria from attaching to the pin consistently (FIG. 17).

FIGS. 18A and 18B show the positive (bacterial growth) and negative (no bacterial growth) results of the surrounding soft tissue and of the bone, respectively. The ChMPEG paste demonstrated an increased antimicrobial effect in the context of the surrounding tissue culture swab, being the only group with no breakthroughs to soft tissue (FIG. 18A). For the bone culture swabs, PMMA was the only experimental group to show total eradication from bone, but the ChMPEG paste only had one break through (FIG. 18B). Statistical analysis showed all groups to be statistically different from the no treatment group.

Figure 19:
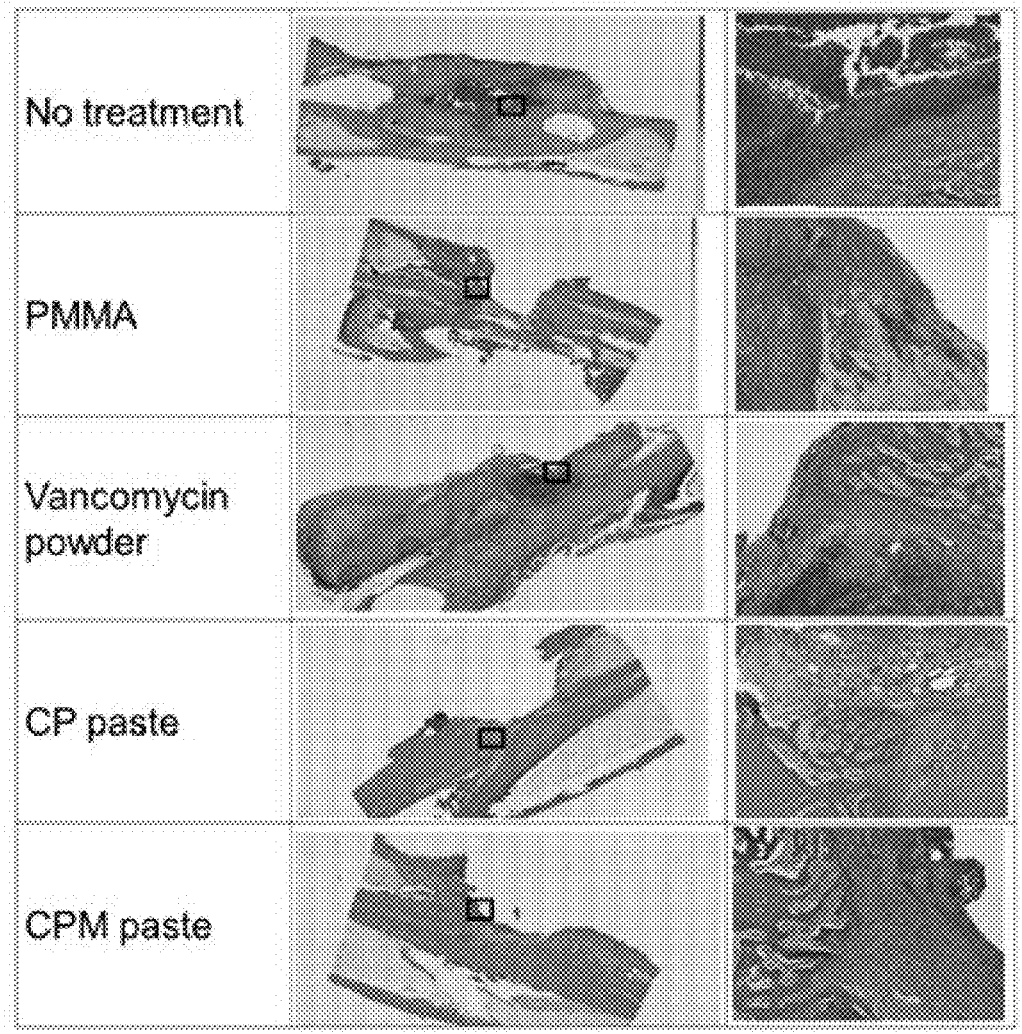
FIG. 19 shows representative histological images for each of the following paste groups: no treatment (row 1), PMMA (row 2), vancomycin powder (row 3), Ch-PEG paste (row 4), and the ChMPEG paste (row 5), at 4 times magnification with areas of interest presented at higher magnification.

FIG. 19 shows representative histological images for each of the following paste groups: no treatment (row 1), PMMA (row 2), vancomycin powder (row 3), Ch-PEG paste (row 4), and ChMPEG paste (row 5), at 4 times magnification with areas of interest presented at higher magnification. The black boxes indicate the region from which higher magnification images were taken. Histological sections of bone in the defect showed areas of high inflammation for non-treated controls (row 1). For PMMA treated groups, there was minimal to moderate inflammation, but little to no tissue growth into the defect area (row 2). The vancomycin powder group (row 3) had tissue fill within the defect, but also areas of high inflammatory cell presence. Both chitosan paste groups (rows 4 and 5) had signs of moderate inflammation and soft tissue fill within the defect, as well as endochondral ossification.

Example 12: Additional Elution Profiles

Materials and Methods

The following example provides vancomycin elution profiles for various polyalcohol blends. The composition of each polyalcohol blend is shown in Table 5 below. Each blend contains varying amounts of chitosan, mannitol, and erythritol. Vancomycin was detected with a UV/Vis spectrophotometer. Antibiotics were passively loaded into each blend by replacing the PBS solution described in Example 1 with a solution of vancomycin at a 10 mg/mL concentration, in PBS. The pastes (0.3 mL, n=3) were injected into a 12 well CELLCROWN insert fitted with a 44 µm nylon filter and submerged in 4 mL of PBS. Sampling occurred daily for 7 days with complete refreshment. Antibiotic concentrations were evaluated with high performance liquid chromatography using a ThermoScientific Dionex Ultimate 3000 Series HPLC system and a BDS Hypersil reversed-phase C18 column (150×4.6 mm). Vancomycin was detected with a UV/Vis spectrophotometer.

TABLE 5

Compositions of Experimental Groups

| Paste Groups | Chitosan (%) | Mannitol (%) | Erythritol (%) |
| --- | --- | --- | --- |
| C2:M1:E1 | 2 | 1 | 1 |
| C2:M1:E2 | 2 | 1 | 2 |
| C1:M1:E0.5 | 1 | 1 | 0.5 |

Results

Figure 20A:
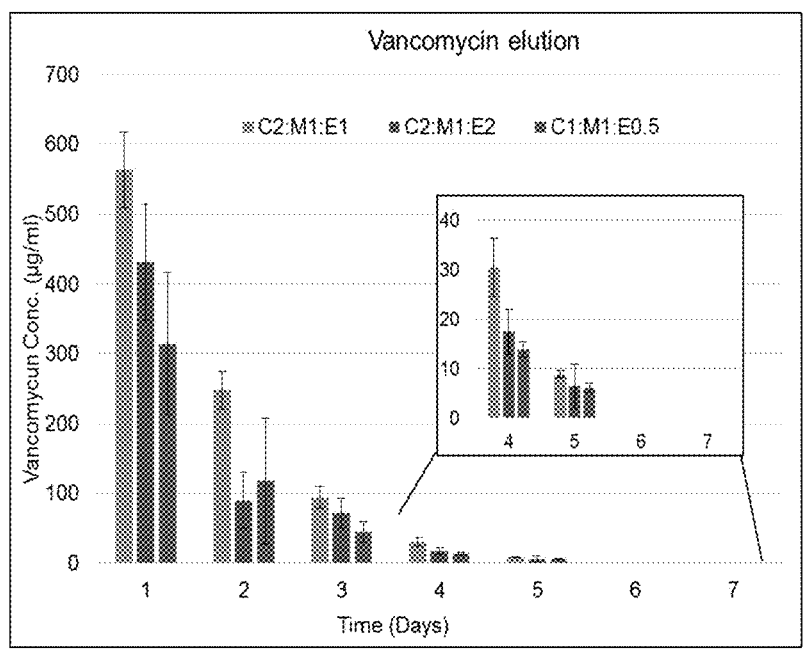
FIG. 20A is a graphical representation showing the daily concentration of vancomycin (μg/mL) detected for each polyalcohol blend over a week. C2:M1:E1 represents 2% chitosan, 1% Mannitol, and 1% Erythritol. C2:M1:E2 represents 2% chitosan, 1% mannitol, and 2% erythritol. C1:M1:E0.05 represents 1% chitosan, 1% mannitol, and 0.05% erythritol.
Figure 20B:
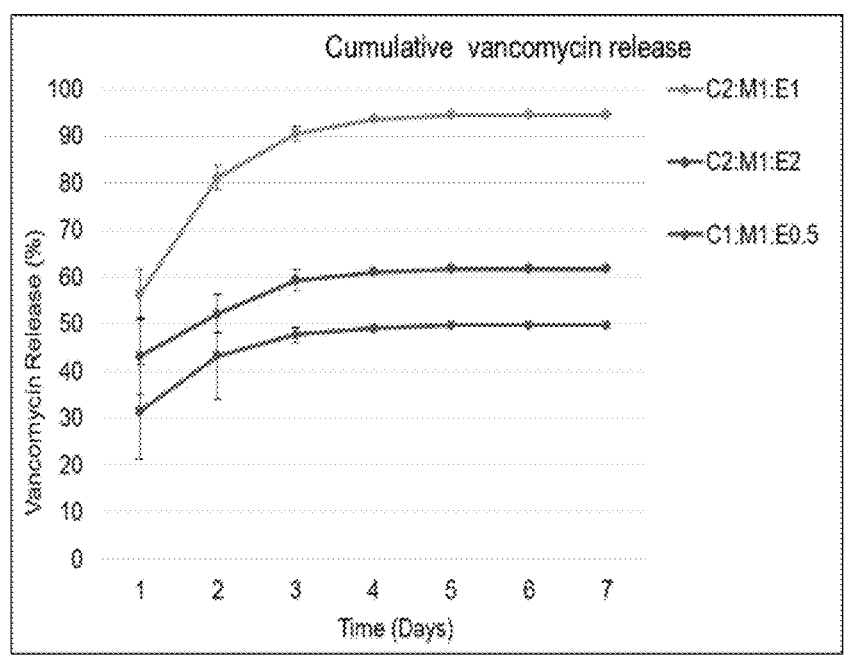
FIG. 20B is a graphical representation showing the cumulative release of percent loaded vancomycin over the seven day time period.

FIGS. 20A and 20B show vancomycin elution profiles for the polyalcohol blends displayed in Table 5 above (i.e., C2:M1:E1, C2:M1:E2, and C1:M1:E0.5). FIG. 20A is a graphical representation showing the daily concentration of vancomycin (µg/mL) detected for each polyalcohol blend over a week. The zoomed in portion of FIG. 20A illustrates the elution data for days 4-7 with the error bars indicating standard deviation. FIG. 20B is a graphical representation showing the cumulative release of percent loaded vancomycin over the seven day time period. As shown in FIGS. 20A and 20B, the C2:M1:E1 blend eluted vancomycin at a higher level over the course of the seven day time period when compared to the C2:M1:E2 and C1:M1:E0.5 blends.

Example 13: *S. aureus* Implant-Associated Osteomyelitis Study

Materials and Methods

To assess the ability of composite paste on established infection, a composite tissue model of *S. aureus* implant-associated osteomyelitis was performed. Briefly, a 1.2 mm diameter bicortical defect was created in the left femur of female Sprague Dawley rats (13 weeks old). Orthopedic titanium screws were inoculated with $10^3$ CFU of *S. aureus* (ATCC 6538-GFP) for 20 minutes prior to implantation into the defect.

For treatment of established biofilm associated infection, at 1 week post-inoculation, orthopedic screws were removed and 150 microliters of composite paste (ChMPEG paste) unloaded with another composition (e.g., antibodies or growth factor) was injected into the infected defect site ("Mannitol paste-unloaded") in the treatment group. For the control group, ("no treatment"), no composite paste was injected. At 4 weeks, animals were euthanized and post-mortem bacterial counts were performed on bone and surrounding soft tissue, using standard plate counting protocols. Differences in bacterial counts, between control and treatment groups were analyzed with one-way Kruskal Wallis ANOVA with Holm-Sidak post hoc testing to detect differences between treatment groups, with significance level (alpha) set at 0.05.

Results

Figure 21:
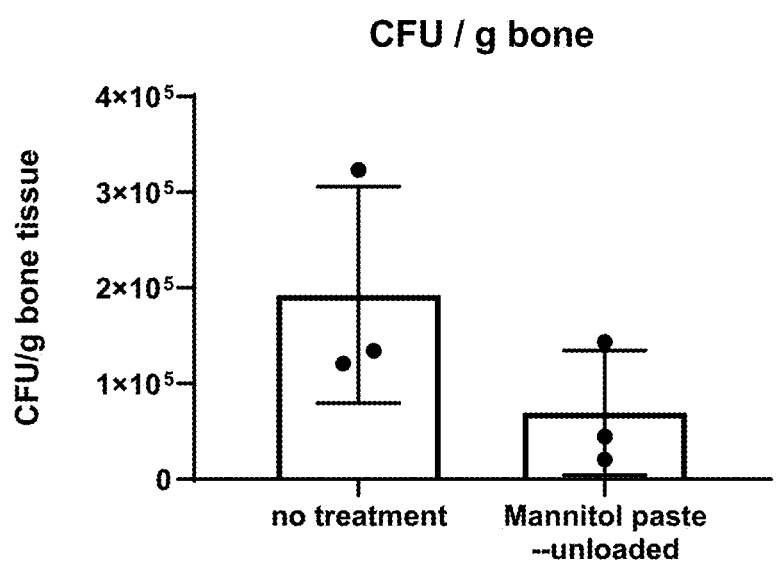
FIG. 21 is a graph and scanner plot showing mean CFU count for *S. aureus* retrieved per gram of bone.

As can be seen in FIG. 21, while the standard deviation bars are wide due to sample size, (n=3), a lower mean CFU count in bone treated with the composite paste was observed as compared to the bone in the control group. These results are significant, as they indicate that ChMPEG paste, unloaded with a biologically active agent, reduces bacterial count at infected defect sites. ChMPEG paste loaded with one or more biologically active agents, such ChMPEG paste loaded with an antibiotic, would be anticipated to reduce colony count further than ChMPEG paste, unloaded with a biologically active agent.

F. Conclusions

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

We claim:

1. A method for producing a biodegradable paste comprising chitosan, mannitol, PEG, and at least one antibiotic, the method comprising:
   (a) dissolving chitosan, mannitol, and PEG in one or more acids in a solvent to form a solution;
   (b) drying the solution to form a composition comprising chitosan, mannitol, and PEG;
   (c) forming a film from the composition;
   (d) grinding the film into a powder; and
   (e) hydrating the powder with a salt solution including at least one antibiotic to form a biodegradable paste, wherein the biodegradable paste does not include an aminoglycoside.

2. The method of claim 1, wherein the at least one antibiotic is selected from the group consisting of: β-lactams, glycopeptides, bacitracins, macrolides, lincosamides, chloramphenicols, tetracyclines, amphotericins, cefazolins, clindamycins, mupirocina, sulfonamides, rifampicins, metronidazoles, quinolones, novobiocins, polymyxins, gramicidins, and combinations thereof.

3. The method of claim 1, wherein the at least one antibiotic comprises a glycopeptide.

4. The method of claim 3, wherein the glycopeptide is vancomycin.

5. The method of claim 1, further comprising incorporating a biologically active agent selected from the group consisting of an antifungal, antiviral, growth factor, anti-inflammatory agent, analgesic, and combinations thereof.

6. The method of claim 1, wherein the biodegradable paste elutes mannitol and the at least one antibiotic agent for at least three days.

7. The method of claim 1, wherein the acid is selected from the group consisting of acetic acid, citric acid, oxalic acid, propionic acid, ascorbic acid, hydrochloric acid, formic acid, salicylic acid, lactic acid, and combinations thereof.

8. The method of claim 1, wherein the acid is acetic acid.

9. The method of claim 1, wherein the solvent is deionized water.

10. The method of claim 1, wherein the chitosan has a degree of deacetylation of about 70 percent or greater.

11. The method of claim 1, wherein the chitosan has a degree of deacetylation of about 82.46±1.679 percent.

12. The method of claim 1, wherein the chitosan has an average molecular weight of about 150,000 Da to about 350,000 Da.

13. The method of claim 1, wherein the chitosan has an average molecular weight of about 250,600 Da.

14. The method of claim 1, wherein the following amounts are dissolved in the solution: about 0.5 percent weight/volume (w/v) to about 3 percent w/v of chitosan; about 1 percent w/v to about 3 percent w/v of mannitol; and about 0.5 percent w/v to about 2 percent w/v of PEG.

15. The method of claim 1, wherein the powder is blended in the salt solution in a ratio of 2.5 mL of salt solution to 1 gram of the powder.

16. A biodegradable paste, comprising:
   a composition including chitosan, mannitol, and PEG and
   a salt solution including at least one antibiotic,
   wherein the composition is blended in the salt solution, and wherein the biodegradable paste does not include an aminoglycoside.

17. The biodegradable paste of claim 16, wherein the at least one antibiotic is selected from the group consisting of: β-lactams, glycopeptides, bacitracins, macrolides, lincosamides, chloramphenicols, tetracyclines, amphotericins, cefazolins, clindamycins, mupirocins, sulfonamides, rifampicins, metronidazoles, quinolones, novobiocins, polymyxins, gramicidins, and combinations thereof.

18. The biodegradable paste of claim 16, wherein the chitosan has a degree of deacetylation of about 70 percent or greater.

19. The biodegradable paste of claim 16, wherein the chitosan has a degree of deacetylation of about 82.46±1.679 percent.

20. The biodegradable paste of claim 16, wherein the PEG has a molecular weight of about 6,000 g/mol to about 9,000 g/mol.

21. The biodegradable paste of claim 16, wherein the PEG a molecular weight of about 8,000 g/mol.

22. The biodegradable paste of claim 16, wherein the paste is biodegradable over a time period of about one day to about four weeks.

23. The biodegradable paste of claim 16, further comprising a biologically active agent selected from the group consisting of an antifungal, antiviral, growth factor, anti-inflammatory agent, analgesic, and combinations thereof.

24. The biodegradable paste of claim 16, wherein the paste elutes mannitol and the at least one antibiotic agent for at least three days.

25. The biodegradable paste of claim 24, wherein the composition elutes mannitol and the at least one antibiotic agent over a time period of about three days to about ten days.

26. The biodegradable paste of claim 16, wherein the at least one antibiotic comprises a glycopeptide.

27. The biodegradable paste of claim 16, wherein the composition is formulated for parenteral injection.

28. The biodegradable paste of claim 26, wherein the glycopeptide is vancomycin.

29. The biodegradable paste of claim 16, wherein the composition is blended in the salt solution in a ratio of 2.5 mL of salt solution to 1 gram of the composition.

30. A method for treating or preventing an infection at a site of trauma in a subject in need of treatment thereof, comprising:
   administering a therapeutically effective amount of the biodegradable paste of claim 16 to the subject.

31. The method of claim 30, wherein the infection is a bacterial, viral, or fungal infection.

32. The method of claim 30, wherein the therapeutically effective amount is sufficient to reduce the survival or proliferation of a bacterial, fungal, or viral cell.

33. The method of claim 30, wherein the site of trauma is a fracture, an open fracture, a wound, a complex wound, a surgical site, surrounding tissues, or any combinations thereof.

34. A method for treating or preventing an infection caused by persister bacterial cells in a subject in need of treatment thereof, comprising:

administering a therapeutically effective amount of the biodegradable paste of claim 16 to reduce the survival or proliferation of persister bacterial cells at a site of the infection.

35. The method of claim 34, wherein the site of the infection is located at a fracture, an open fracture, a wound, a complex wound, a surgical site, an implanted indwelling device, surrounding tissues, or any combinations thereof.

36. A method for treating or preventing the formation of biofilm bacteria on an indwelling medical device or surrounding tissue, comprising:
administering a therapeutically effective amount of the biodegradable paste of claim 16 to reduce the number of biofilm bacteria present on one or both of the indwelling medical device and surrounding tissue.

37. The method of claim 36, wherein the step of administering comprises coating the indwelling medical device with the therapeutically effective amount of the biodegradable paste prior to implantation.

38. The method of claim 36, wherein the step of administering comprises injecting the therapeutically effective amount of the biodegradable paste at or near the indwelling medical device and surrounding tissue subsequent to implantation.

39. An indwelling medical device comprising the biodegradable paste of claim 16.

* * * * *